United States Patent
Tsai

(10) Patent No.: US 11,405,139 B2
(45) Date of Patent: Aug. 2, 2022

(54) CODE BLOCK GROUP (CBG) LEVEL RETRANSMISSION IN WIRELESS COMMUNICATION SYSTEM

(71) Applicant: MEDIATEK INC., Hsinchu (TW)

(72) Inventor: Cheng-Rung Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/727,275

(22) Filed: Dec. 26, 2019

(65) Prior Publication Data

US 2020/0220663 A1   Jul. 9, 2020

Related U.S. Application Data

(60) Provisional application No. 62/838,382, filed on Apr. 25, 2019, provisional application No. 62/790,157, filed on Jan. 9, 2019.

(51) Int. Cl.
*H04L 1/16* (2006.01)
*H04L 1/18* (2006.01)

(52) U.S. Cl.
CPC .......... *H04L 1/1671* (2013.01); *H04L 1/1812* (2013.01); *H04L 1/1829* (2013.01)

(58) Field of Classification Search
CPC ... H04L 1/1671; H04L 1/1829; H04L 1/1812; H04L 1/1864; H04L 1/1822
See application file for complete search history.

(56) References Cited

U.S. PATENT DOCUMENTS 10,091,117 B2   10/2018 Sun et al.
2012/0275395 A1*  11/2012 Gerstenberger ...... H04L 1/1854
                                                              370/329
2017/0026297 A1   1/2017 Sun et al.
2018/0123767 A1*  5/2018 Islam ...................... H04L 1/189
2018/0234211 A1*  8/2018 Liu ........................ H04L 1/1614
(Continued)

FOREIGN PATENT DOCUMENTS

CN           106888074 A      6/2017
WO    WO 2017/019193 A1      2/2017
(Continued)

OTHER PUBLICATIONS

English translation of the International Search Report and Written Opinion of the International Searching Authority dated Mar. 26, 2020 in PCT/CN2020/070779, 9 pages.

(Continued)

*Primary Examiner* — Hassan Kizou
*Assistant Examiner* — Abdullahi Ahmed
(74) *Attorney, Agent, or Firm* — Oblon, McClelland, Maier & Neustadt, L.L.P.

(57) ABSTRACT

A method of data retransmission can include receiving a transport block (TB) including code block groups (CBGs) corresponding to a first hybrid automatic repeat request (HARQ) process from a transmitter at a receiver in a wireless communication system, and transmitting a TB/CBG indicator along with HARQ retransmission information from the receiver. The HARQ retransmission information includes a HARQ acknowledgement (HARQ-ACK) feedback or a retransmission indication for the first HARQ process. The TB/CBG indicator indicates whether the HARQ-ACK feedback or the retransmission indication is TB-level or CBG-level.

20 Claims, 18 Drawing Sheets

(56) References Cited

U.S. PATENT DOCUMENTS

| | | | | |
|---|---|---|---|---|
| 2018/0270022 A1* | 9/2018 | Sun | .................. | H04L 1/0061 |
| 2018/0376490 A1* | 12/2018 | Lunttila | ............ | H04W 72/1268 |
| 2019/0007959 A1* | 1/2019 | Hwang | ............ | H04W 72/0446 |
| 2019/0021088 A1* | 1/2019 | Zhang | ................ | H04W 72/12 |
| 2019/0150122 A1* | 5/2019 | Ying | ................ | H04W 72/14 |
| | | | | 370/329 |
| 2020/0221310 A1* | 7/2020 | Babaei | .............. | H04L 1/1671 |
| 2021/0135791 A1* | 5/2021 | Wang | ................ | H04L 1/0009 |

FOREIGN PATENT DOCUMENTS

| WO | WO 2018/128369 A1 | 7/2018 |
|---|---|---|
| WO | WO 2018/204491 A1 | 11/2018 |

OTHER PUBLICATIONS

Combined Taiwanese Office Action and Search Report dated Jan. 29, 2021 in Taiwanese Patent Application No. 108148501 (with English translation of Category of Cited Documents), 21 pages.

\* cited by examiner

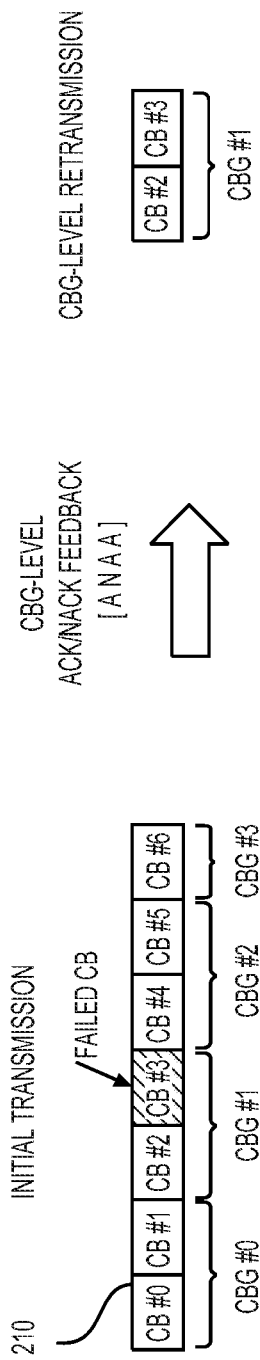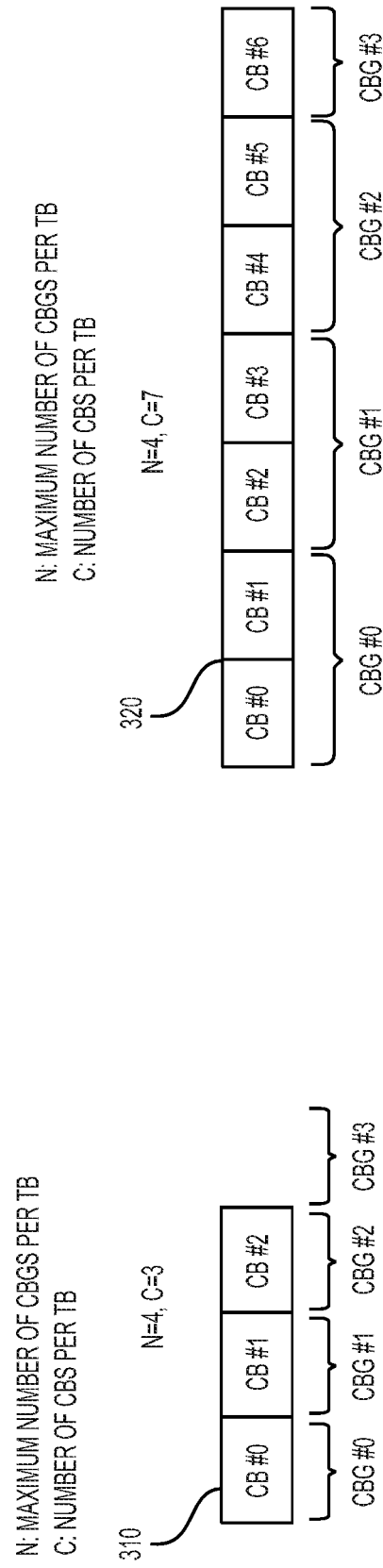

| HARQ PROCESS | #N | #N+1 | #N+2 | #N+3 | #N+4 | #N+5 | #N+6 | #N+7 |
|---|---|---|---|---|---|---|---|---|
| NDI | TOGGLED | TOGGLED | NOT TOGGLED | TOGGLED | NOT TOGGLED | NOT TOGGLED | NOT TOGGLED | NOT TOGGLED |
| CBGTI | XXXX XXXX | XXXX XXXX | 0010 1001 | XXXX XXXX | 1100 0111 | 0101 0101 | 1111 1111 | 1010 0101 |

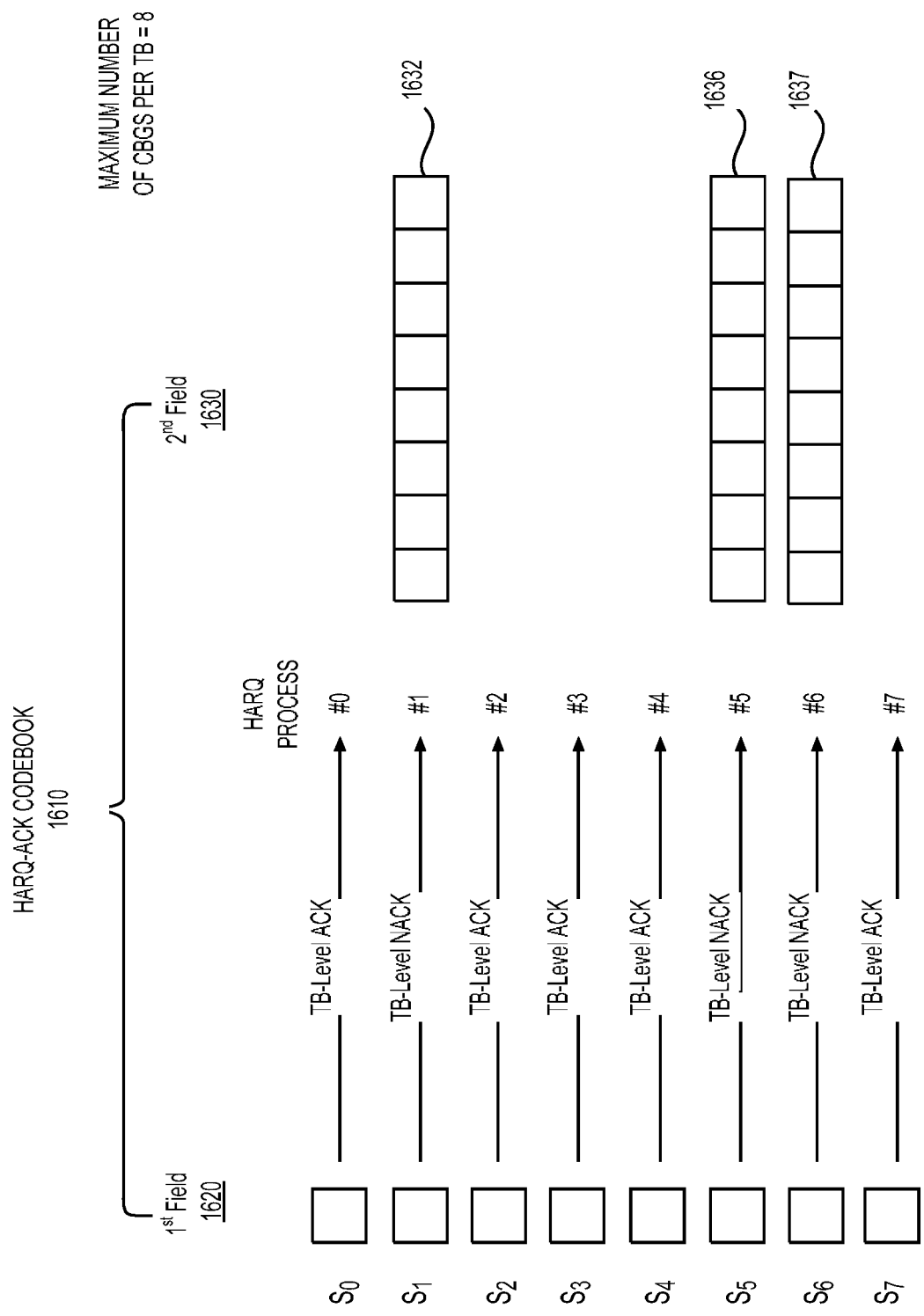

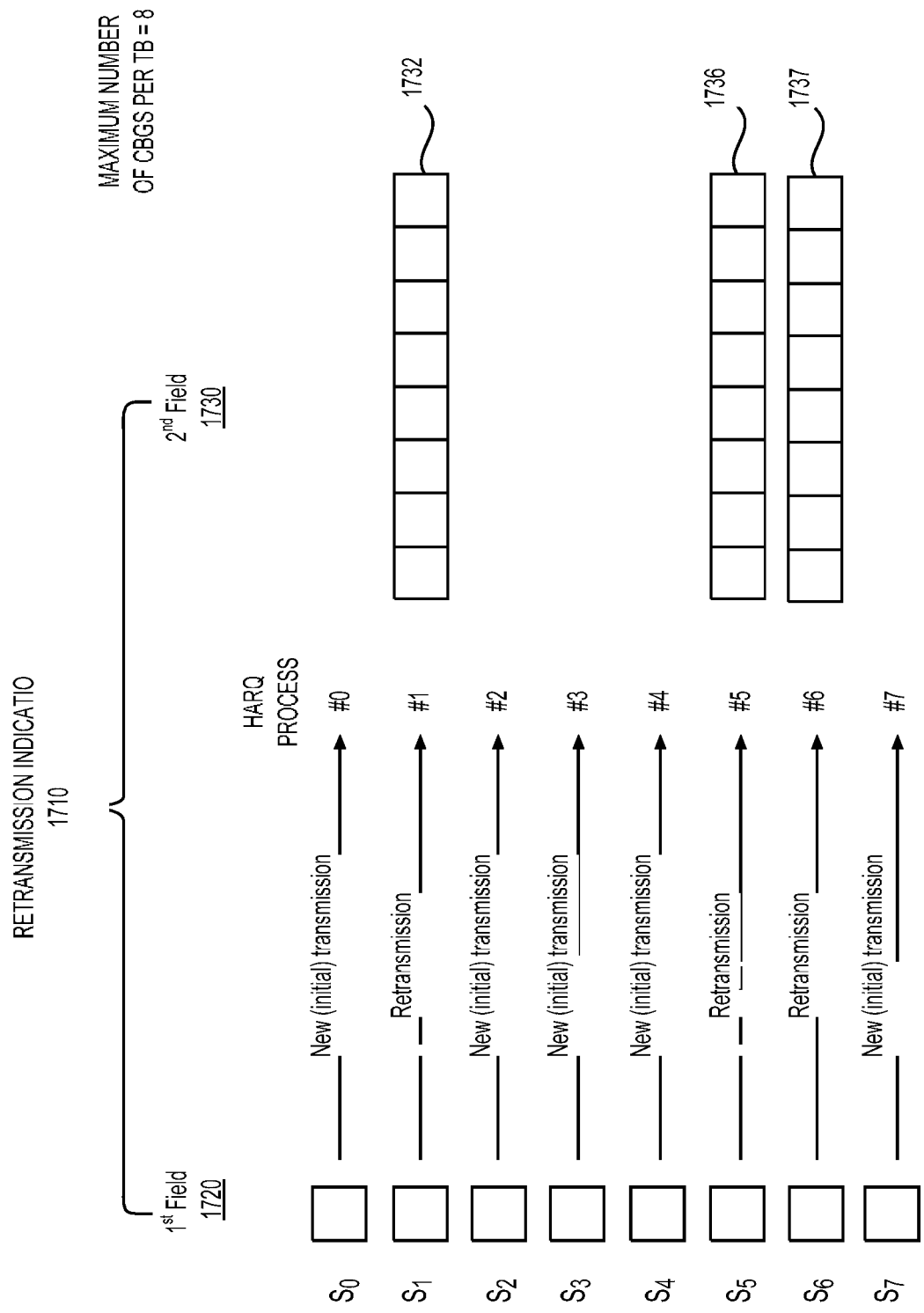

CODE BLOCK GROUP (CBG) LEVEL RETRANSMISSION IN WIRELESS COMMUNICATION SYSTEM

INCORPORATION BY REFERENCE

This present application claims the benefit of U.S. Provisional Application No. 62/790,157, "Code Block Group Level HARQ ACK/NACK Codebook" filed on Jan. 9, 2019, and No. 62/838,382, "Retransmission Indication for Multiple Data Transmissions Schedule by a Single Grant" filed on Apr. 25, 2019, which are incorporated herein by reference in their entirety.

TECHNICAL FIELD

The present disclosure relates to wireless communications, and specifically relates to data retransmission techniques (e.g., hybrid automatic repeat request (HARQ) related schemes).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Transmission over wireless channels is subject to errors due to variations in the received signal quality. Such variations can be counteracted by employing a hybrid automatic repeat request (HARQ) scheme. HARQ is a combination of error correcting coding and retransmission of erroneous data units. For example, after detecting an erroneous data unit transmitted from a transmitter, a receiver can request a retransmission from the transmitter by providing a HARQ feedback to the transmitter.

SUMMARY

Aspects of the disclosure provide a method of data retransmission. The method can include receiving a transport block (TB) including code block groups (CBGs) corresponding to a first hybrid automatic repeat request (HARQ) process from a transmitter at a receiver in a wireless communication system, and transmitting a TB/CBG indicator along with HARQ retransmission information from the receiver. The HARQ retransmission information includes a HARQ acknowledgement (HARQ-ACK) feedback or a retransmission indication for the first HARQ process. The TB/CBG indicator indicates whether the HARQ-ACK feedback or the retransmission indication is TB-level or CBG-level.

In an embodiment, the transmitter is a base station (BS) and the receiver is a user equipment (UE) in the wireless communication system, and the HARQ retransmission information is a HARQ-ACK codebook including HARQ-ACK feedbacks for a number of HARQ processes configured at the UE. In an example, the TB/CBG indicator indicates whether each HARQ-ACK feedback for the number of HARQ processes configured at the UE is TB-level or CBG-level.

In an embodiment, the transmitter is a UE, and the receiver is a BS in the wireless communication system, and the HARQ retransmission information is one of: a HARQ-ACK codebook including HARQ-ACK feedbacks for a first number of HARQ processes configured at the UE, or a retransmission indicator including retransmission indications for a second number of HARQ processes configured at the UE including the first HARQ process. In an example, the TB/CBG indicator indicates whether each HARQ-ACK feedback for the first number of HARQ processes configured at the UE is TB-level or CBG-level, or whether each retransmission indications for the second number of HARQ processes configured at the UE is TB-level or CBG-level. In an example, the retransmission indicator is included in an uplink grant that schedules multiple uplink data transmissions corresponding to the second number of HARQ processes configured at the UE.

In an embodiment, the first HARQ process is provided with the HARQ-ACK feedback in TB level when all the CBGs in the TB of the first HARQ process are decoded correctly, no CBG in the TB of the first HARQ process is decoded correctly, or the TB of the first HARQ process is not detected.

In an embodiment, the first HARQ process is provided with the retransmission indication in TB level when all the CBGs in the TB of the first HARQ process are decoded correctly, or no CBG in the TB of the first HARQ process is decoded correctly.

In an embodiment, the HARQ retransmission information includes HARQ-ACK feedbacks or retransmission indications for HARQ processes belonging to a same component carrier or different component carriers used by the transmitter and the receiver. In an embodiment, an amount of HARQ processes in the HARQ retransmission information that are each provided with a HARQ-ACK feedback or a retransmission indication in CBG level is restricted to be smaller or equal to a preconfigured number.

Aspects of the disclosure provide a receiver comprising circuitry. The circuitry is configured to receive a TB including CBGs corresponding to a first HARQ process from a transmitter in a wireless communication system, and transmit a TB/CBG indicator along with HARQ retransmission information. The HARQ retransmission information includes a HARQ-ACK feedback or a retransmission indication for the first HARQ process. The TB/CBG indicator indicates whether the HARQ-ACK feedback or the retransmission indication is TB-level or CBG-level.

Aspects of the disclosure provide a method of data retransmission. The method can include receiving a TB including CBGs corresponding to a first HARQ process from a transmitter at a receiver in a wireless communication system, and transmitting HARQ retransmission information from the receiver. The HARQ retransmission information includes a first field that indicates a TB-level ACK or NACK for the first HARQ process, or indicates a new transmission or retransmission for the first HARQ process. When the first field indicates a TB-level NACK for the first HARQ process, the HARQ retransmission information further includes a second field indicating CBG-level ACKs or NACKs for the first HARQ process. When the first field indicates a retransmission, the HARQ retransmission information further includes a second field providing CBG-level retransmission indications for the first HARQ process.

In an embodiment, the transmitter is a BS and the receiver is a UE in the wireless communication system. The first field of the HARQ retransmission information indicates TB-level ACKs or NACKs for a number of HARQ processes configured at the UE. In an embodiment, the transmitter is a UE, and the receiver is a BS in the wireless communication system. The first field of the HARQ retransmission information indicates TB-level ACKs or NACKs for a first number of HARQ processes configured at the UE, or TB-level new transmissions or retransmissions for a second number of HARQ processes configured at the UE. The HARQ retransmission information can be included in an uplink grant that schedules multiple uplink data transmissions corresponding to the second number of HARQ processes configured at the UE.

In an embodiment, the HARQ retransmission information includes TB-level ACK/NACK indications or TB-level new transmission or retransmissions for HARQ processes belonging to a same component carrier or different component carriers used by the transmitter and the receiver.

BRIEF DESCRIPTION OF THE DRAWINGS

Various embodiments of this disclosure that are proposed as examples will be described in detail with reference to the following figures, wherein like numerals reference like elements, and wherein:

FIG. 2 shows an example of a code block group (CBG) based hybrid automatic repeat request acknowledgement (HARQ-ACK) feedback and data retransmission operation;

FIGS. 3A-3B show examples of how CBGs are formed in a transport block (TB);

FIG. 10 shows an example of retransmission indication information 1000 carried in a single uplink grant scheduling multiple PUSCHs;

FIG. 16 shows an example of HARQ-ACK codebook 1610 according to an embodiment of the disclosure;

FIG. 17 shows an example of a retransmission indication 1710 according to an embodiment of the disclosure;

DETAILED DESCRIPTION OF EMBODIMENTS

Figure 1:
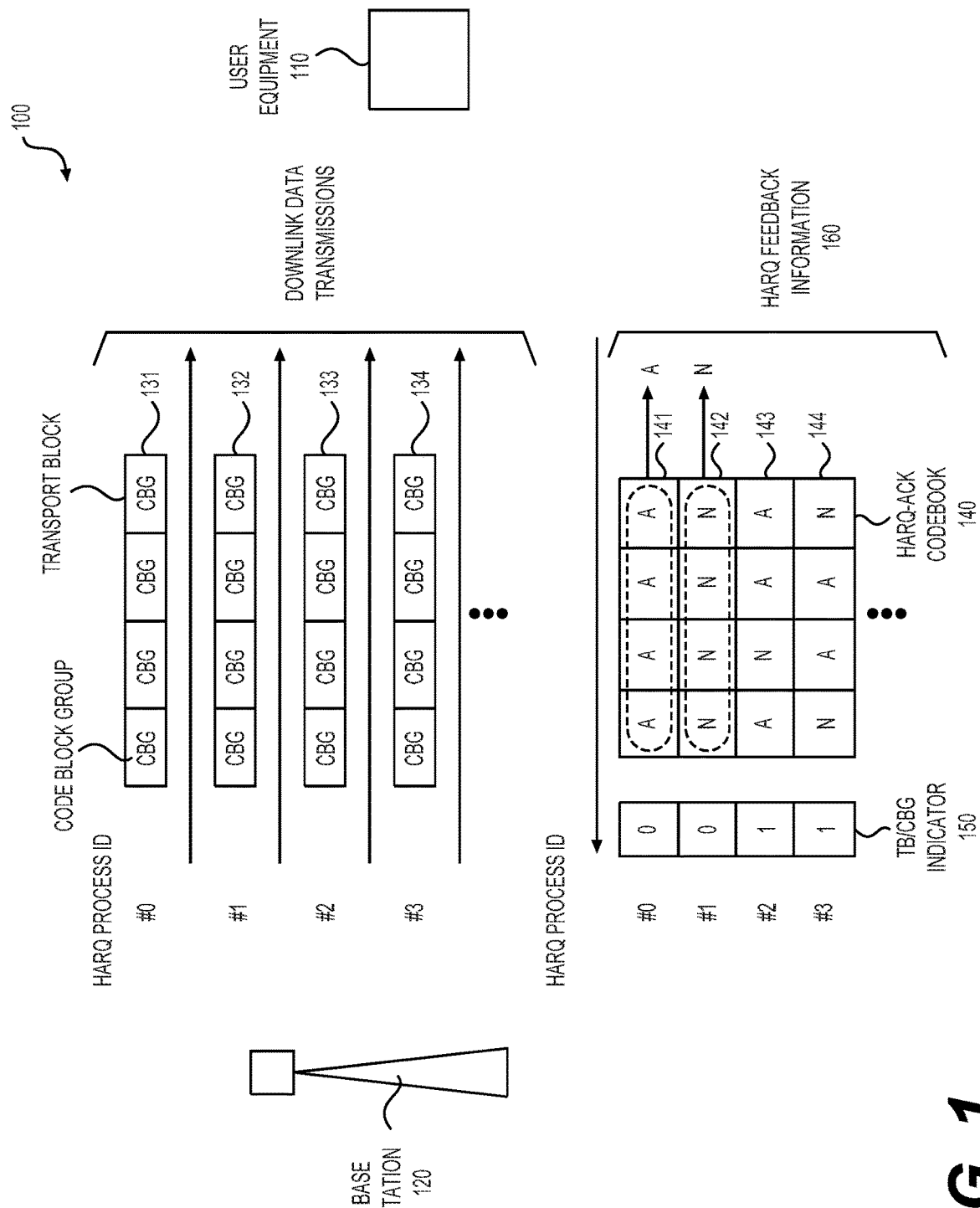
FIG. 1 shows a wireless communication system 100 according to some embodiments of the disclosure.

FIG. 1 shows a wireless communication system 100 according to some embodiments of the disclosure. The system 100 can include a user equipment (UE) 110 and a base station (BS) 120. In some examples, the system 100 employs the fifth-generation (5G) New Radio (NR) air interface developed by the 3rd Generation Partnership Project (3GPP). In some examples, the system 100 employs other wireless communication technologies developed by various standard development organizations. In some examples, the system 100 employs non-standardized wireless communication technologies.

In some examples, the BS 120 can be a base station implementing a gNB node as specified in the 5G NR air interface standards developed by 3GPP. In one example, the BS 120 can be configured to control one or more antenna arrays to form directional Tx or Rx beams for transmitting or receiving wireless signals. The UE 110 can be a mobile phone, a laptop computer, a vehicle carried mobile communication device, a utility meter fixed at a certain location, and the like. Similarly, the UE 110 can employ one or more antenna arrays to generate directional Tx or Rx beams for transmitting or receiving wireless signals in one example. Depending on the air interface between the BS 120 and the UE 110, the BS 120 and the UE 110 can communicate with each other according to respective communication protocols.

In various examples, the system 100 can employ a hybrid automatic repeat request (HARQ) scheme for data transmission or retransmission in downlink or uplink direction. For example, the HARQ scheme can employ a HARQ entity at a MAC layer of the BS 120. The HARQ entity includes a set of stop-and-wait processes operating in parallel. Each stop-and-wait process (referred to as a HARQ process) can transmit a transport block (TB), and stops and waits for HARQ-acknowledgement (HARQ-ACK) information from the UE 110. The HARQ-ACK information can be a single bit indicating positive acknowledgement (ACK) or negative acknowledgement (NACK). If a NACK is received, retransmission of the TB can be performed.

At the UE 110, another HARQ entity including an equal number of HARQ processes as at the BS 120 can be configured for receiving TBs from the BS 120. Each HARQ process at the UE 110 corresponds to a counterpart HARQ process at the BS 120. Upon receiving a TB at each HARQ process, the UE 110 makes an attempt to decode the TB, and generate the acknowledgement indicating whether the transport block is correctly decoded or not.

Similarly, HARQ entities or processes can be configured at the UE 110 and the BS 120 for implementing the HARQ scheme for uplink data retransmission. For example, for uplink data retransmission, the HARQ feedback information can be in a form of a retransmission indication carried in an uplink scheduling grant (uplink grant). The retransmission indication provides sufficient information to inform the UE 110 of a retransmission of a TB in uplink.

In some examples, the system 100 can employ a code block group (CBG) based HARQ scheme for data retransmission. For example, the BS 120 can transmit a TB that is segmented into CBGs. The UE 110 can separately decode the CBGs, and provide a HARK-ACK feedback for the TB in CBG level. Based on the CBG-level HARQ-ACK feedback, the BS 120 can only retransmit CBGs that are negatively acknowledged instead of the entire TB. As a result, data retransmission can be more efficient in terms of radio resource consumption, particularly for larger-size TBs.

However, when the CBG-level HARQ scheme is used, the size of respective HARQ-ACK feedback for downlink data transmission (or retransmission indication for uplink data transmission) can be increased significantly compared with the HARQ scheme with TB-level HARQ feedback information. FIG. 1 shows such an example for downlink data transmission. As shown, the BS 120 may perform multiple downlink data transmissions to transmit TBs 131-134 with HARQ processes #0-#3, respectively. The TB in each downlink transmission can be partitioned into 4 CBGs. The multiple downlink transmissions can span over multiple slots in an orthogonal frequency division multiplex (OFDM) resource grid and cross multiple component carriers.

As a response, the UE 110 can provide HARQ feedback information 160 in CBG level. As an option, the HARQ feedback information 160 can be a HARQ-ACK codebook 140 including CBG-level HARQ-ACK feedbacks 141-144 for each HARQ process #0-#3. As shown, the CBG-level HARQ-ACK codebook 140 can have a size of 16 bits.

In some examples, a one-shot HARQ-ACK feedback scheme is employed where the latest status (e.g., HARQ-ACK report pending or already reported) of all HARQ processes configured at the UE 110 are reported to the BS 120 in one HARQ-ACK feedback. For a configuration with 8 CBGs per TB and 16 HARQ processes, a payload of the report would have a size of 128 bits in total.

Accordingly, in some embodiments, a hybrid HARQ feedback mechanism is employed to compress the HARQ feedback information when the CBG-level HARQ scheme is used. For example, as shown in the HARQ-ACK codebook 140, the HARQ-ACK feedback 141 for the HARQ process #0 includes 4 ACKs, which represents all CBGs in the TB 131 are correctly decoded. Accordingly, a TB-level HARQ-ACK feedback can be used in place of the CBG-level HARQ-ACK feedback. Specifically, one bit indicating an ACK, instead of 4 bits indicating 4 ACKs, can be used in the HARQ-ACK codebook 140 for the HARQ feedback corresponding to the HARQ process 141.

Similarly, the HARQ-ACK feedback 142 for the HARQ process #1 includes 4 NACKs, which represents none of the CBGs in the TB 132 are detected or correctly decoded. Accordingly, a TB-level HARQ-ACK feedback (one-bit NACK) can be used in place of the CBG-level HARQ-ACK feedback that includes 4 bits of NACKs. For the HARQ processes #2 and #3, as the HARQ-ACK feedbacks 143-144 each include correctly or incorrectly decoded CBGs, the CBG-level feedbacks can still be maintained. In this way, the size of the HARQ-ACK codebook 140 can be reduced from 16 bits to 10 bits, resulting in a data compression ratio of 16:10.

To indicate whether a HARQ-ACK feedback for a HARQ process is provided in TB level or CBG level, a TB/CBG level indicator 150 can be introduced in the HARQ information 160. As shown, TB/CBG level indicator values for the HARQ processes #0 and #1 are set to be 0 to indicate a TB-level HARQ-ACK feedback, while for the HARQ processes #2 and #3, respective TB/CBG level indicator values are set to be 1 to indicate a CBG-level HARQ-ACK feedback.

The above TB and hybrid HARQ feedback mechanism can also be applied to data transmission in uplink direction. For example, when a HARQ-ACK codebook is transmitted from the BS 120, or when a retransmission indicator for multiple HARQ processes is provided in a grant scheduling multiple physical uplink shared channels (PUSCHs), the hybrid HARQ feedback mechanism can be employed to compress the respective HARQ feedback information. The respective HARQ feedback information can be HARQ-ACK information in the HARQ-ACK codebook, or the retransmission indication information of the retransmission indicator in the uplink scheduling grant (uplink grant).

FIG. 2 shows an example of a CBG-based HARQ-ACK feedback and data retransmission operation. A TB 210 is transmitted from a transmitter (e.g., the BS 120) to a receiver (e.g., the UE 110). The TB 210 is partitioned into 7 CBs from CB #0 to CB #6 that are organized into 4 CBGs from CBG #0 to CBG #3. During the reception of the TB 210 at the UE 110, decoding of CB #3 fails. Accordingly, the UE 110 can transmit a CBG-level ACK/NACK feedback [A N A A] where A denotes an ACK bit while N denotes a NACK bit. The ACK or NACK bits correspond to the 4 CBGs from CBG #0 to CBG #3, respectively. As a response, the BS 120 can perform a CBG-level retransmission where CBG #1 is retransmitted. In some other examples, the TB 120 can be transmitted from the UE 110 to the BS 120, the CBG-level ACK/NACK feedback [A N A A] can be provided in a form a retransmission indicator, e.g., [0 1 0 0] in an uplink grant transmitted from the BS 120 to the UE 110, where "0" indicates the respective CBG shall not be retransmitted, while "1" indicates the respective CBG shall be retransmitted.

As shown, in contrast to a TB-based HARQ-ACK feedback, a finer ACK/NACK feedback (or a finer retransmission indication in an uplink grant) based on CBGs can be used to provide HARQ ACK/NACK feedback. Accordingly, only the CBG(s) with failed CB(s) is transmitted rather than an entire TB, which improves spectrum efficiency.

In contrast, in examples where the CBG-based HARQ scheme in FIG. 2 is not employed, if a code block (CB) decoding fails while decoding a TB, the whole TB has to be retransmitted. This TB-based HARQ leads to performance degradation particularly in cases of large TB size (e.g., a TB contains numerous CBs), severe time varying interference, ultra-reliable low-latency communication (URLLC) preemption of an enhanced mobile broadband (eMMB) ongoing transmission (partial punctured transmission), or interference from hidden nodes in NR unlicensed-band operation.

FIGS. 3A-3B show examples of how CBGs are formed in a TB. In an embodiment, a maximum number of CBGs in a TB, denoted by N, can be provided by a higher layer signaling (e.g., radio resource control (RRC) signaling) or a system information broadcast from the BS 120 to the UE 110 so that the BS 120 and the UE 110 can have a common understanding of the maximum number of CBGs per TB. In one example, N can be 2, 4, 6, or 8 in different configurations.

The TB size determination and the number of CBs in a TB (denoted by C) can be independent from the maximum number, N, of CBGs in one TB. For example, a TB size can be determined based on allocated radio resources and a respective modulation and coding scheme (MCS). When a TB having a certain size is received from a MAC layer at a physical layer, the TB (including an appended cyclic redundancy check (CRC)) can be partitioned into multiple (e.g., dozens or hundreds of) CBs to match a code size of a channel encoder (e.g., a low-density parity-check (LDPC) coder) for encoding a CB. CBs each with an appended CRC can then be fed into the channel encoder, and the resulting bits are concatenated to form a coded TB.

The C number of CBs in a TB can be grouped into multiple CBGs having a number of Min (N, C). In the FIG. 3A example, there are 4 CBGs in a TB (N=4), and 3 CBs (CB #0-CB #2) are generated (C=3). Accordingly, there are 3 CBGs in the TB each including one CB. In the FIG. 3B example, there are still 4 CBGs in a TB (N=4), however, 7 CBs (CB #0-CB #6) are generated. Accordingly, there are 4 CBGs in the respective TB each including one or two CBs.

Figure 4:
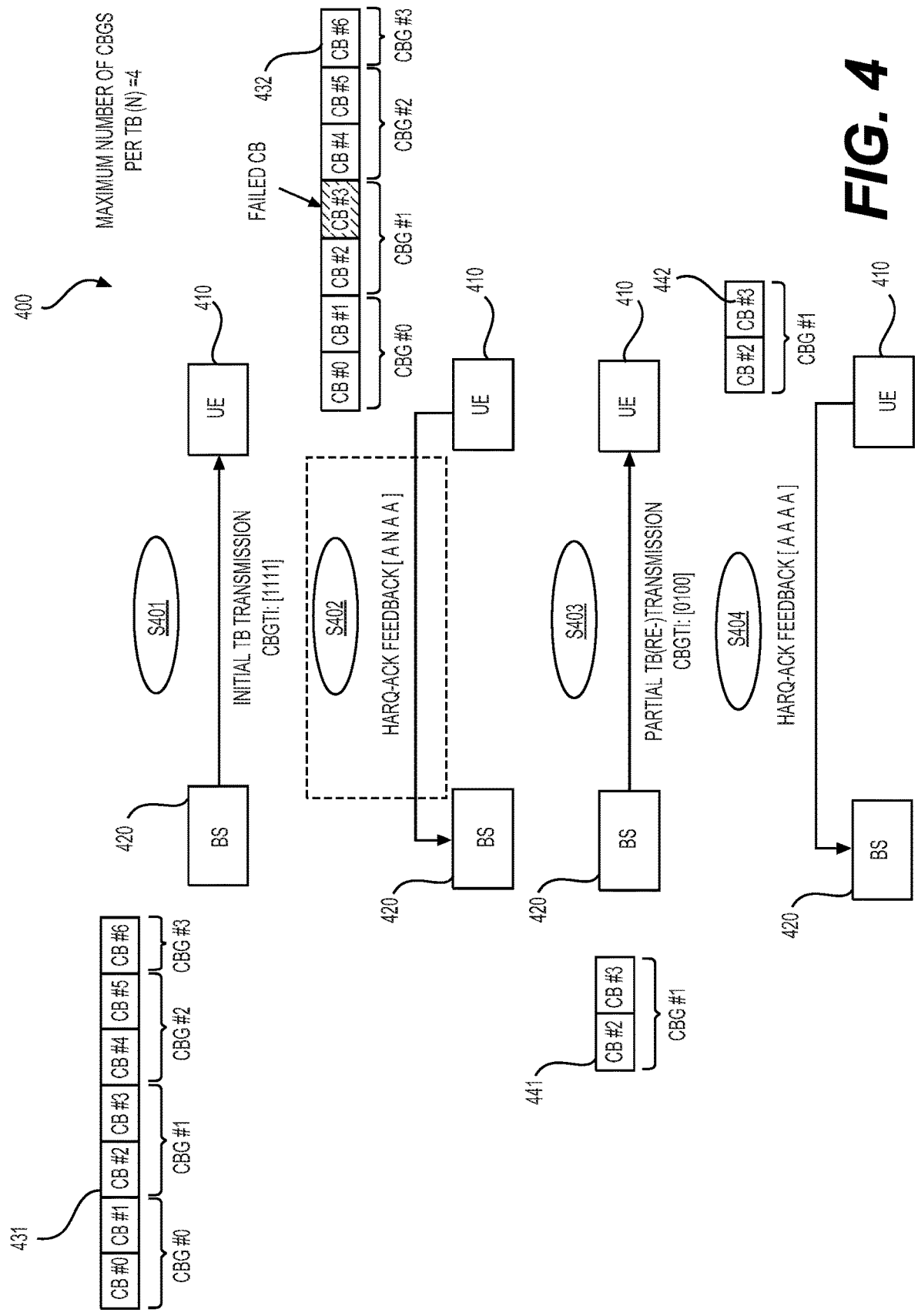
FIG. 4 shows an example of a CBG-based HARQ process 400 of data transmission in downlink direction.

FIG. 4 shows an example of a CBG-based HARQ process 400 of data transmission in downlink direction. The process 400 can include 4 steps from S401 to S404, and be performed by a BS 420 and a UE 410. The BS 420 can configure a maximum number of CBGs per TB, which is 4 in the FIG. 4 example, to the UE 410, for example, by RRC signaling.

At S401, the BS 420 transmits a first TB 431, which is an initial transmission. The TB 431 can include CB #0-CB #6 organized into CBG #0-CBG #3. The TB 431, after channel coding and rate matching, may be carried in a first physical downlink shared channel (PDSCH). A first downlink control information (DCI) scheduling the initial transmission on the first PDSCH can be carried in a first physical control channel (PDCCH) accompanying the PDSCH. The first DCI of the initial transmission can include a first CBG transmission indicator (CBGTI) which, for example, indicates which the CBGs are present in the transmitted TB 431. However, the UE 410 may ignore the first CBGTI, and assumes all CBGs are present in the initial transmission.

The UE 410 decodes the first PDCCH to obtain the first DCI, and subsequently decode the first PDSCH to obtain a decoded TB 432 that is a decoded version of the TB 431. As an example, decoding of CB #3 can fail, while decoding of other CBs #0-#2, and CBs #4-#6 are successful. For example, a CRC attached to each CB can be checked to determine if the respective CB is decoded correctly. The UE 410 may accordingly generate a first HARQ-ACK feedback including bits [A N A A]. The first HARQ-ACK feedback indicates CBGs #0, #2, and #3 are received correctly, but CBG #1 is not.

At S402, the UE 410 may transmit the first HARQ-ACK feedback including the bits [A N A A] to the BS 420, for example, using a resource indicated by the first DCI. For example, the first HARQ-ACK can be carried in a physical uplink control channel (PUCCH), or a physical uplink shared channel (PUSCH).

At S403, in response to receive the first HARQ-ACK feedback, the BS 420 may retransmit the CBG #1 carried in a second TB 441. A second CBGTI carried in a second DCI may accompany the second TB 441 to indicate which CBGs are present or absent in the second TB 441. For example, the second CBGTI can still include 4 bits [0 1 0 0] that indicate CBG #1 (the second CBG) of the initial TB 431 is carried in the second TB 441 while the first, third, and fourth CBGs of the initial TB 431 are not present in the second TB 441. The second TB 441 can be carried in a second PDSCH, while the second DCI can be carried in a second PDCCH.

Based on the second CBGTI, the UE 410 can determine CBG #1 of the initial TB 431 is being retransmitted while CBGs #0, #2, and #3 are not, and may combine decoded CBG #1 in a decoded TB 442 with previously successively received CBGs #0, #2, and #3 to form a complete decoded TB of the initial TB 431.

At S404, as the retransmitted date has been successively decoded, the UE 410 may provide a second HARQ-ACK feedback to the BS 120. The second HARQ-ACK feedback can include bits [A A A A] to indicate all CBGs of the initial transmission at S401 has been correctly received. The process can then terminate thereafter.

Figure 5:
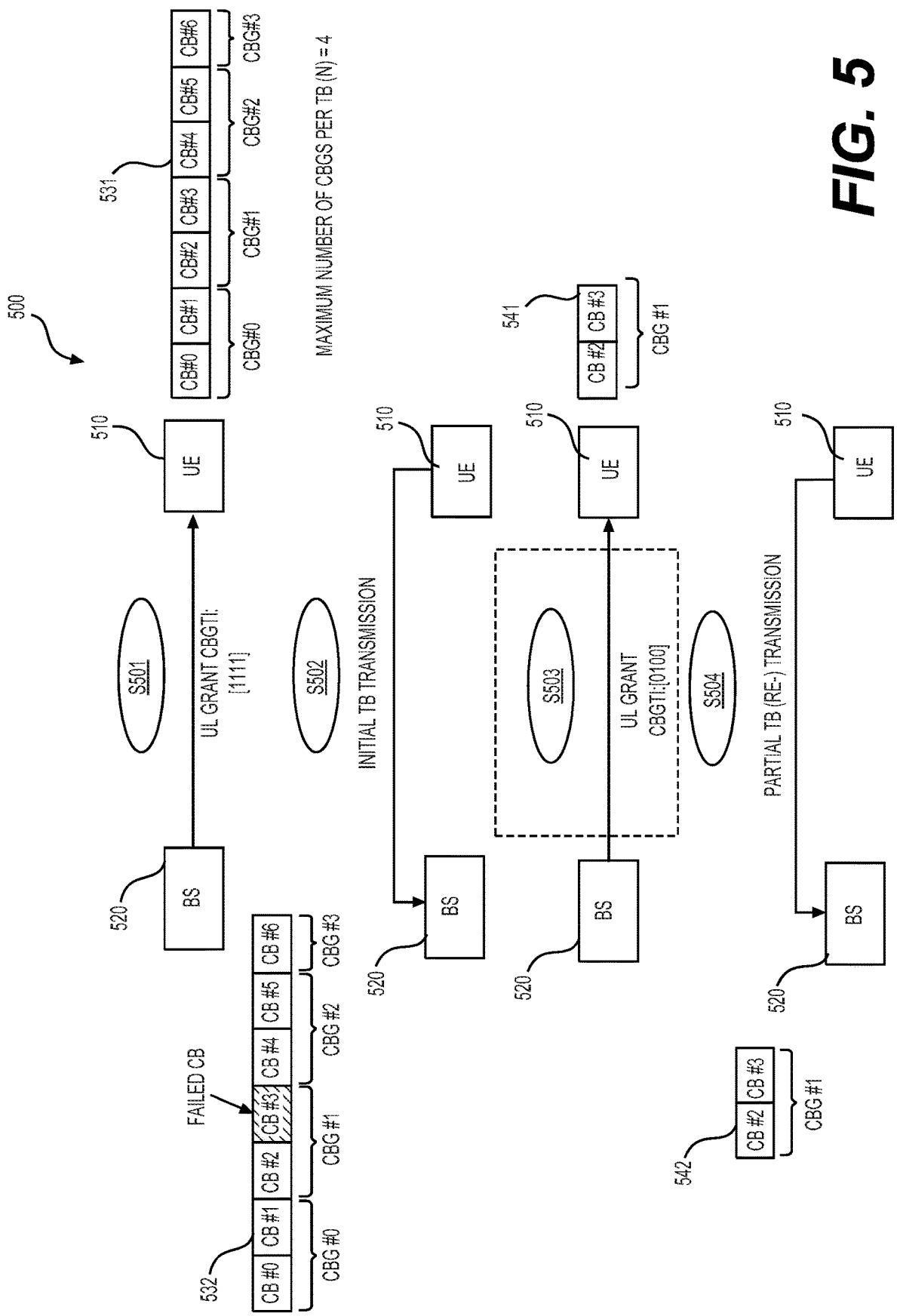
FIG. 5 shows an example of a CBG-based HARQ process 500 of data transmission in uplink direction.

FIG. 5 shows an example of a CBG-based HARQ process 500 of data transmission in uplink direction. The process 500 can include steps from S501 to S504, and be performed by a BS 520 and a UE 510. Similarly, the BS 520 may configure a maximum number of CBGs per TB to the UE 510 which is 4 in FIG. 5.

At S501, the BS 520 can transmit a first uplink scheduling grant (uplink grant) to the UE 510. For example, the first uplink grant is carried in a first DCI, and specifies an uplink resource for the UE 510 to transmit a TB 531. The first uplink grant may carry a first CBGTI indicating which CBGs are to be transmitted in the TB 531. The UE 510 may ignore the first CBGTI as the transmission of the TB 531 would be an initial transmission of the TB 531, and assume all CBGs are to be transmitted in the initial transmission.

The UE 510 may prepare the TB 531 based on the first uplink grant from the BS 520. As an example, the TB 531 includes CB #0-#6 organized into CBGs #0-#3.

At S502, the UE 510 transmits the TB 531 as an initial transmission to the BS 520, for example, carried in a first PUSCH. The BS 520 decodes the first PUSCH from the UE 510 to obtain a decoded TB 532. As an example, decoding of the CB #3 fails, and decoding of the other CBs in the TB 532 are successful. Accordingly, the BS 520 can determine the CBG #1 is to be retransmitted.

At S503, the BS 520 transmits a second uplink grant in a second DCI to schedule a second uplink transmission. Particularly, the second uplink grant can include a second CBGTI to indicate which CBGs in the initial TB 531 is to be retransmitted. For example, the second CBGTI from the BS 520 can include bits [0 1 0 0] each corresponding to a CBG in the initial TB 531. "0" indicates the respective CBG shall not be retransmitted, while "1" indicates the respective CBG shall be retransmitted.

Based on the second CBGTI received from the BS 520, the UE 510 can prepare a second TB 541 that includes the CBG #1 of the initial TB 531.

At S504, the UE 510 may transmit the second TB 541 carried in a second PUSCH to the BS 520, which is a partial retransmission of the initial TB 531. The BS 120 decodes the second PUSCH from the UE 510, and obtain a decoded TB 542 that include the CBG #1 of the initial TB 531. The process 500 can then terminates.

Figure 6:
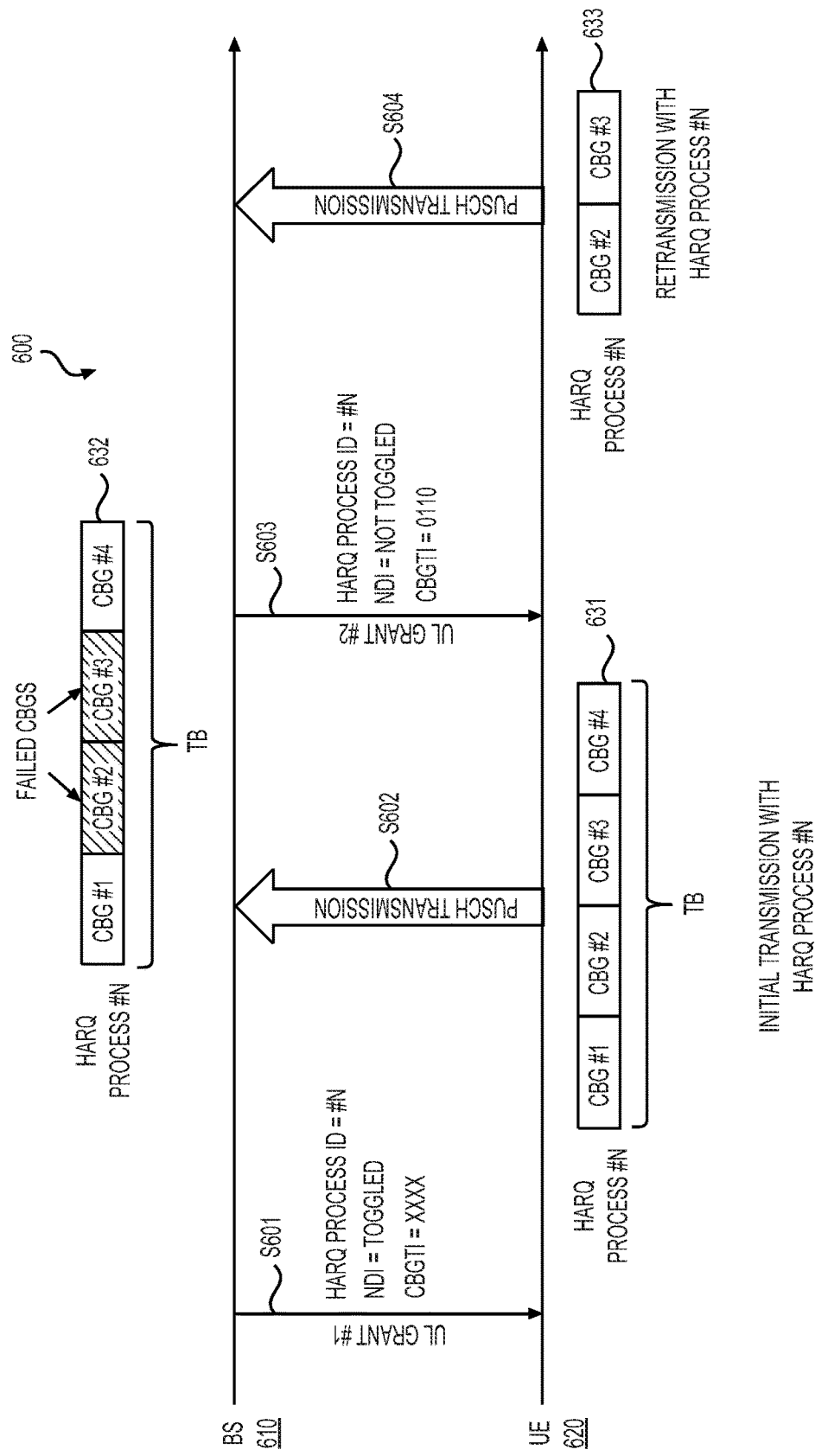
FIG. 6 shows another example of a CBG-based HARQ process 600 of data transmission in uplink direction.

FIG. 6 shows another example of a CBG-based HARQ process 600 of data transmission in uplink direction. In the process 600, a pair of specific HARQ processes with an ID of #n at the UE 610 and the BS 620 are described. Also, operations of new data indicators (NDIs) as carried in uplink grants are described. The process 600 can include steps from S601 to S604, and be performed by the UE 610 and the BS 620.

At S601, the BS 620 transmits a first uplink grant, UL grant #1, to the UE 610. The UL grant #1 can include a first field carrying a HARQ process ID (e.g., #n), a second field carrying a first NDI, and a third field carrying a first CBGTI. As the UL grant #1 is used for scheduling an initial data transmission, the first NDI can have a state of "toggled" compared with a state of a preceding NDI corresponding to the HARQ process #n in a UL grant prior to the UL grant #1. Based on the UL grant #1, the UE 610 can determine that the UL grant #1 schedules the initial data transmission to be performed by the HARQ process #n. The first CBGTI can be ignored, and the UE 610 can transmit all CBGs in a TB 631 to be transmitted.

At S602, the UE 610 can perform the initial data transmission with the HARQ process #n to transmit the TB 631 over a first PUSCH. As shown, the TB 631 can include 4 CBGs from CBG #1 to CBG #4. The BS 620 performs decoding to obtain a decoded TB 632 of the initial TB 631. Receptions of the CBGs #2 and #3 fail.

At S603, the BS 620 can accordingly transmit a second uplink grant, UL grant #2, to schedule a retransmission for the failed CBGs #2 and #3. Specifically, the UL grant #2 may include a first field indicating the same HARQ process ID, #n, as in the UL grant #1. The UL grant #2 can also include a second field indicating a second NDI having a state of "not toggled" compared with the first NDI in the UL grant #1. The state of "not toggled" indicates the retransmission is to be performed with resources specified by the UL grant #2. The UL grant #2 can also include a third field indicating a second CBGTI to indicate which CBGs are to be retransmitted. The second CBGTI can have bits [0 1 1 0] corresponding to the decoding results of the decoded TB 632.

Based on the UL grant #2, the UE 610 can determine to retransmit CBGs #2 and #3 of the initial TB 631.

At S604, the UE 610 retransmits a second TB 633 including CBGs #2 and #3 with the HARQ process #n as indicated by the UL grant #2 over a second PUSCH. The process 600 terminates thereafter.

Figure 7:
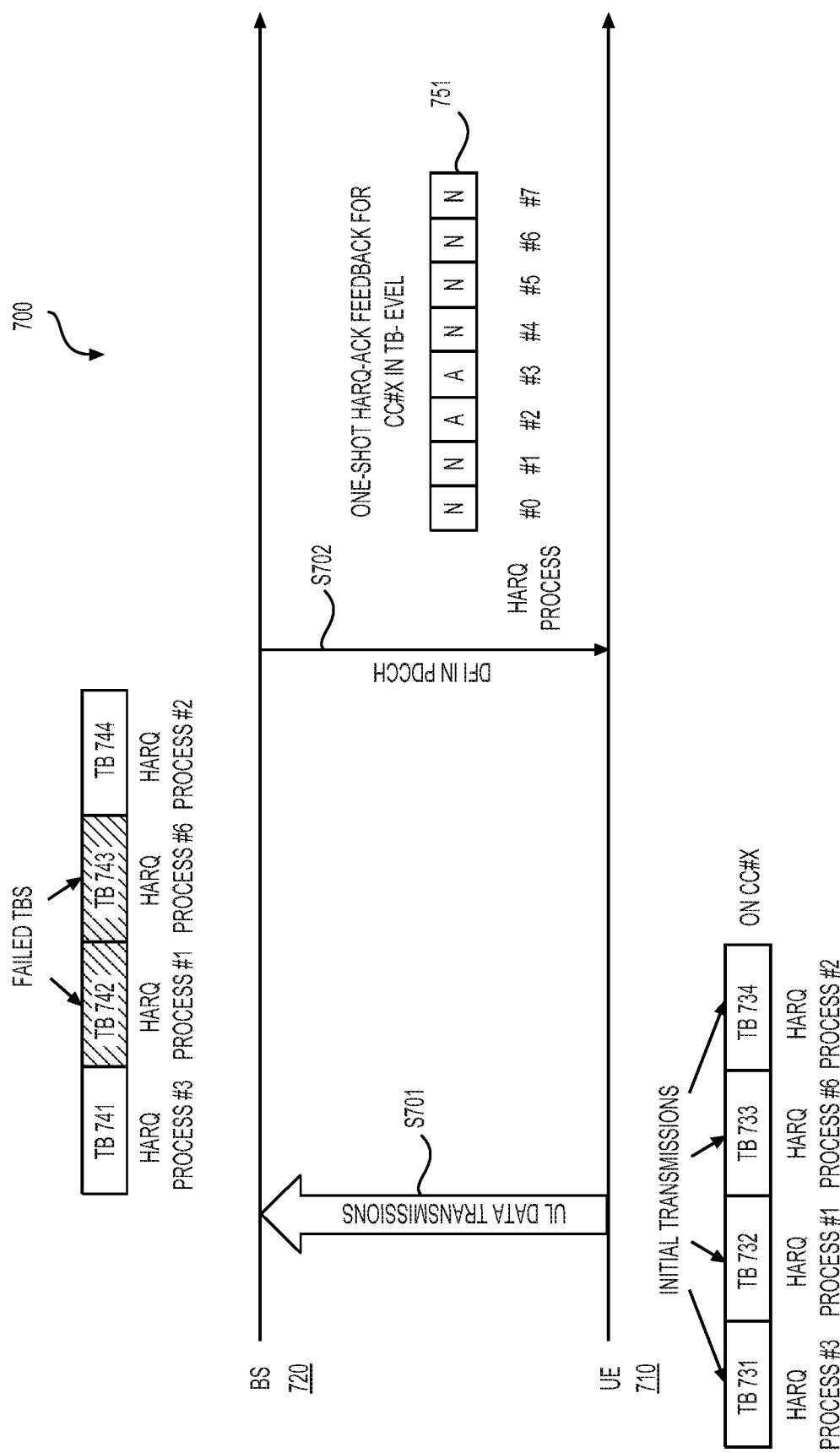
FIG. 7 shows an example process 700 of TB-level one-shot HARQ-ACK feedback for uplink data transmission.

FIG. 7 shows an example process 700 of TB-level one-shot HARQ-ACK feedback for uplink data transmission. The process 700 includes steps S701 and S702, and performed by a UE 710 and a BS 720.

At S701, the UE 710 performs multiple initial transmissions of TBs 731-734 with multiple HARQ processes #3, #1, #6, and #2, respectively, on a component carrier CC #x. The initial transmissions of TBs 731-734 are in TB level, and the CBG scheme is not employed. For example, the transmissions of the TBs 731-734 can take place in different plots in an OFDM grid.

The BS 720 performs receptions to obtain decoded TBs 741-744 corresponding to the initial TBs 731-734 with HARQ processes #3, #1, #6, and #2, respectively. As an example, the TBs 742-743 are decoded incorrectly, or missed (undetected).

At S702, the BS 720 may perform a one-shot HARQ-ACK feedback. In the one-shot HARQ-ACK feedback, a HARQ-ACK codebook 751 including HARQ-ACK feedbacks for multiple or all configured HARQ processes at the UE 710 can be transmitted. For example, there can be 8 HARQ processes from #0 to #7 configured at the UE 710. The HARQ-ACK codebook 751 can include 8 bits, each either ACK or NACK, corresponding to the 8 HARQ processes #0-#7. In one example, the latest status of each HARQ process is reported in the one-shot HARQ-ACK codebook. For example, an ACK is reported for a HARQ process correctly decoding a TB (e.g., the HARQ processes #3 and #2), while a NACK is reported for a HARQ process incorrectly decoding a TB (e.g., the HARQ processes #1, #6, and #7), or without detecting a TB during a preconfigured period prior to the one-shot HARQ-ACK feedback (e.g., the HARQ processes #0, #4, and #5). In one example, the one-shot HARQ-ACK codebook 751 is carried in a downlink feedback information (DFI) in a PDCCH.

As an example, the UE 710 and the BS 720 may operate on an unlicensed spectrum, and the frequency of the component carrier CC #x can be shared with hidden devices (e.g., Wi-Fi receivers or transmitters), and is not always available. When the component carrier CC #x is available, for example, after a listen-before-talk (LBT) access procedure, the BS 720 can determine to take the opportunity to provide the one-shot HARQ-ACK feedback to the UE 710.

As a response to the one-shot HARQ-ACK feedback, the UE 710 may or may not perform retransmissions in one example. In case retransmissions are performed, the processes provided with NACKs can perform retransmissions with PUSCH resources scheduled by uplink grants or preconfigured by the BS 720 without any uplink grants being provided. The process 700 can then terminates.

Figure 8:
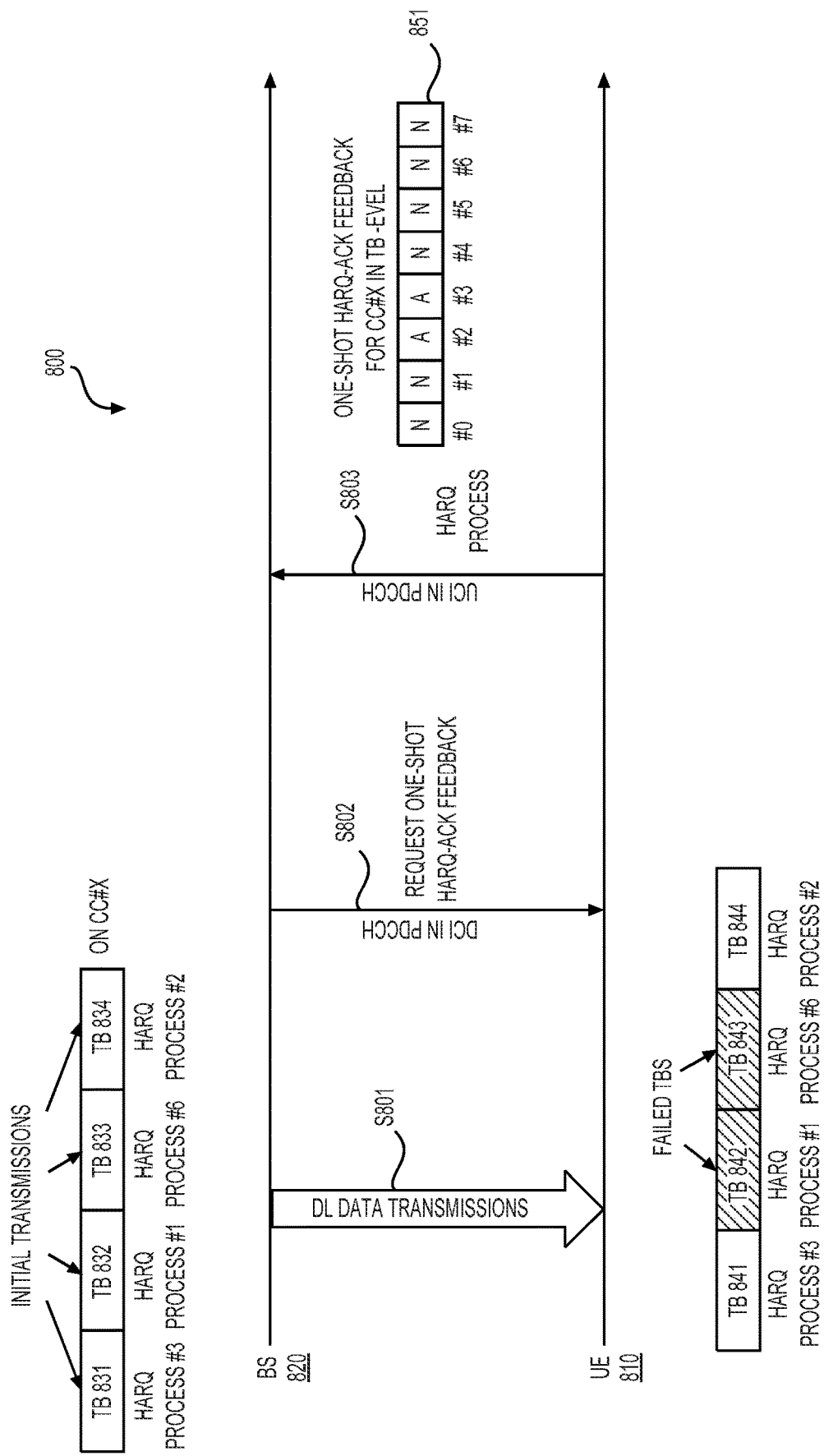
FIG. 8 shows an example process 800 of TB-level one-shot HARQ-ACK feedback for downlink data transmissions.

FIG. 8 shows an example process 800 of TB-level one-shot HARQ-ACK feedback for downlink data transmissions. The process 800 can include steps from S801 to S803, and performed by a UE 810 and a BS 820.

At S 801, the BS 820 can perform initial transmissions of TBs 831-834 with HARQ processes #3, #1, #6, and #2, respectively, over a component carrier CC #x. The UE 810 can perform receptions to obtain decoded TBs 841-844 corresponding to the initial TBs 831-834 with the HARQ processes #3, #1, #6, and #2, respectively. Decoding of the TBs 842 and 843 can fail. The TBs 831-834 can be transmitted in different slots.

At S802, the BS 820 may transmit a request for a one-shot HARQ-ACK feedback of all HARQ processes configured at the UE 810. The request can be carried in a DCI in a PDCCH. For example, HARQ-ACK feedback transmission opportunities are not available (e.g., while operating over an unlicensed spectrum) for a while, or transmissions of HARQ-ACK feedback from the UE 810 have been missed by the BS 820 due to severe interferences. The BS 820 would have no HARQ-ACK processes available for downlink data transmissions. Accordingly, the BS 820 may determine to transmit the request for the one-shot HARQ-ACK feedback to trigger the UE 810 to provide the needed HARQ-ACK feedback. The request may be accompanied with resource scheduling information (for example, carried in an uplink scheduling grant (uplink grant), or a downlink scheduling assignment) for scheduling resources for the one-shot HARQ-ACK feedback. The resource scheduling information can be carried in the same DCI as the request for the one-shot HARQ-ACK feedback.

At S803, the UE 810 performs the TB-level one-shot HARQ-ACK feedback as a response to receiving the request for the one-shot HARQ-ACK feedback. A HARQ-ACK codebook 851 including ACKs or NACKs for all configured HARQ processes from #0 to #7 can be included in an uplink control information (UCI) and transmitted over a PUCCH resource. In other examples, the HARQ codebook may be carried in a PUSCH. In response to receiving the UCI at S803, the BS 820 may perform data retransmissions as indicated by the one-shot HARQ-ACK feedback at S803 in a later stage. The process 800 can then terminate.

Figure 9:
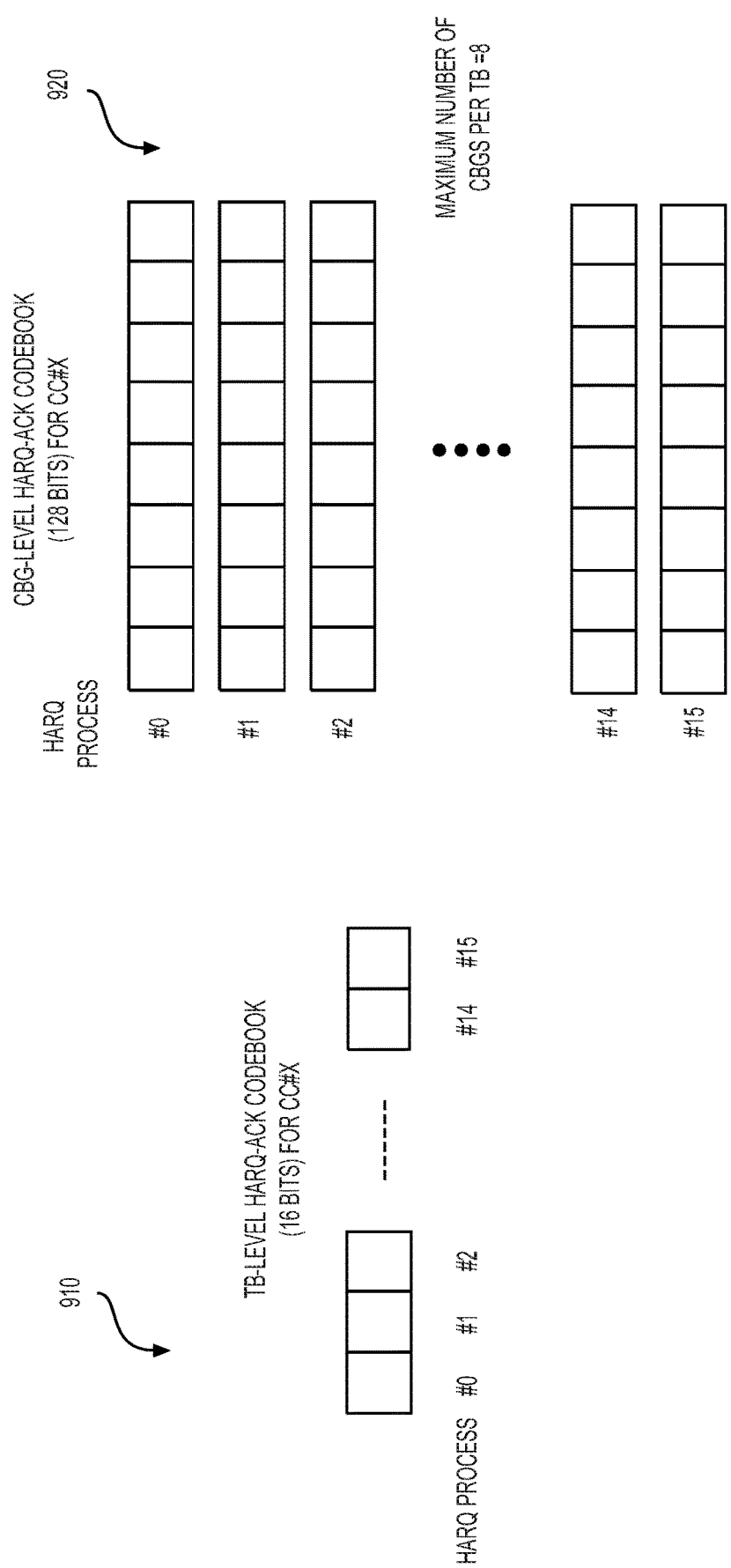
FIG. 9 shows a comparison between sizes of a TB-level one-shot HARQ-ACK codebook 910 and a CBG-level one-shot HARQ-ACK codebook 920.

FIG. 9 shows a comparison between sizes of a TB-level one-shot HARQ-ACK codebook 910 and a CBG-level one-shot HARQ-ACK codebook 920. The two codebooks 910 and 920 can include TB-level or CBG-level HARQ-ACK feedbacks for 16 HARQ processes from #0 to #15 configured for a component carrier CC #x. For the codebook 920, the CBG-based HARQ scheme is adopted with a maximum number of CBGs per TB equal to 8. Accordingly, the TB-level one-shot HARQ-ACK codebook 910 can include 16 bits (ACK or NACK) for the 16 HARQ processes, while the CBG-level one-shot HARQ-ACK codebook 920 can include 128 bits with each HARQ process having 8 bits ACKs or NACKs for the respective 8 CBGs.

As can be seen, the size of the codebook 920 can scale up as the maximum number of CBGs per TB (e.g., 2, 4, 6 or 8 CBGs per TB) or the number of HARQ processes increases, which leads to a large payload size in a DFI or UCI that carries the one-shot HARQ-ACK feedback. Thus, a compression scheme for reducing the size of CBG-level one-shot HARQ-ACK feedback codebook is desirable.

Accordingly, in some embodiments, hybrid TB-level or CBG-level HARQ-ACK feedbacks are simultaneously included in a one-shot HARQ-ACK feedback codebook. For a HARQ process without detected CBGs, without correctly decoded CBGs, or with all CBGs decoded correctly, a CBG-level HARQ feedback is not necessary. Instead, TB-level HARQ feedback can be used. In contrast, for a HARQ process with both failed CBGs and successful CBGs, a CBG-level HARQ feedback can be employed. In this way, a total size of a one-shot HARQ feedback codebook can be reduced.

FIG. 10 shows an example of retransmission indication information 1000 carried in a single uplink grant scheduling multiple PUSCHs. For example, the uplink grant schedules 8 PUSCHs for 8 uplink data transmissions or retransmissions with 8 HARQ processes from #n to #n+7 at a UE. For example, for each HARQ process, a HARQ process ID, a NDI, and a CBGTI can be included in the uplink grant. When a maximum of 8 CBGs is configured in a TB, each CBGTI can include 8 bits corresponding to the respective CBGs in a respective TB. Accordingly, a size of the CBGTI bits can be 64 bits. As can be seen, a size of the CBGTI bits can be proportional to the maximum number of CBGs configured in a TB as well as the number of PUSCHs that can be scheduled by a single uplink grant, which can similarly lead to a large payload size of a DCI carrying the uplink grant scheduling the multiple PUSCHs. Accordingly, the compression scheme is desirable to reduce the size of the CBGTI bits used for retransmission indication.

As shown, the HARQ processes #n, #n+1, and #n+3 each have a NDI of "toggled", which indicates an initial data transmission for each respective HARQ processes. In contrast, the HARQ processes #n+2, and #n+4-#n+7 each have a NDI of "not toggled", which indicates a data retransmission for each respective HARQ processes. In addition, the CBGTI of each toggled NDI can indicate which CBGs in the respective initial TB are to be retransmitted.

Similarly, hybrid TB-level and CBG-level retransmission indications can be included in the retransmission indication information 1000. For example, for a HARQ process without correctly decoded CBGs (e.g., the HARQ process #n+6 in FIG. 10), or with an initial transmission (e.g., the HARQ process #n), a CBG-level retransmission indication is not necessary. In contrast, for a HARQ process with both correctly and incorrectly decoded CBGs, a CBG-level retransmission indication can be used.

Figure 11:
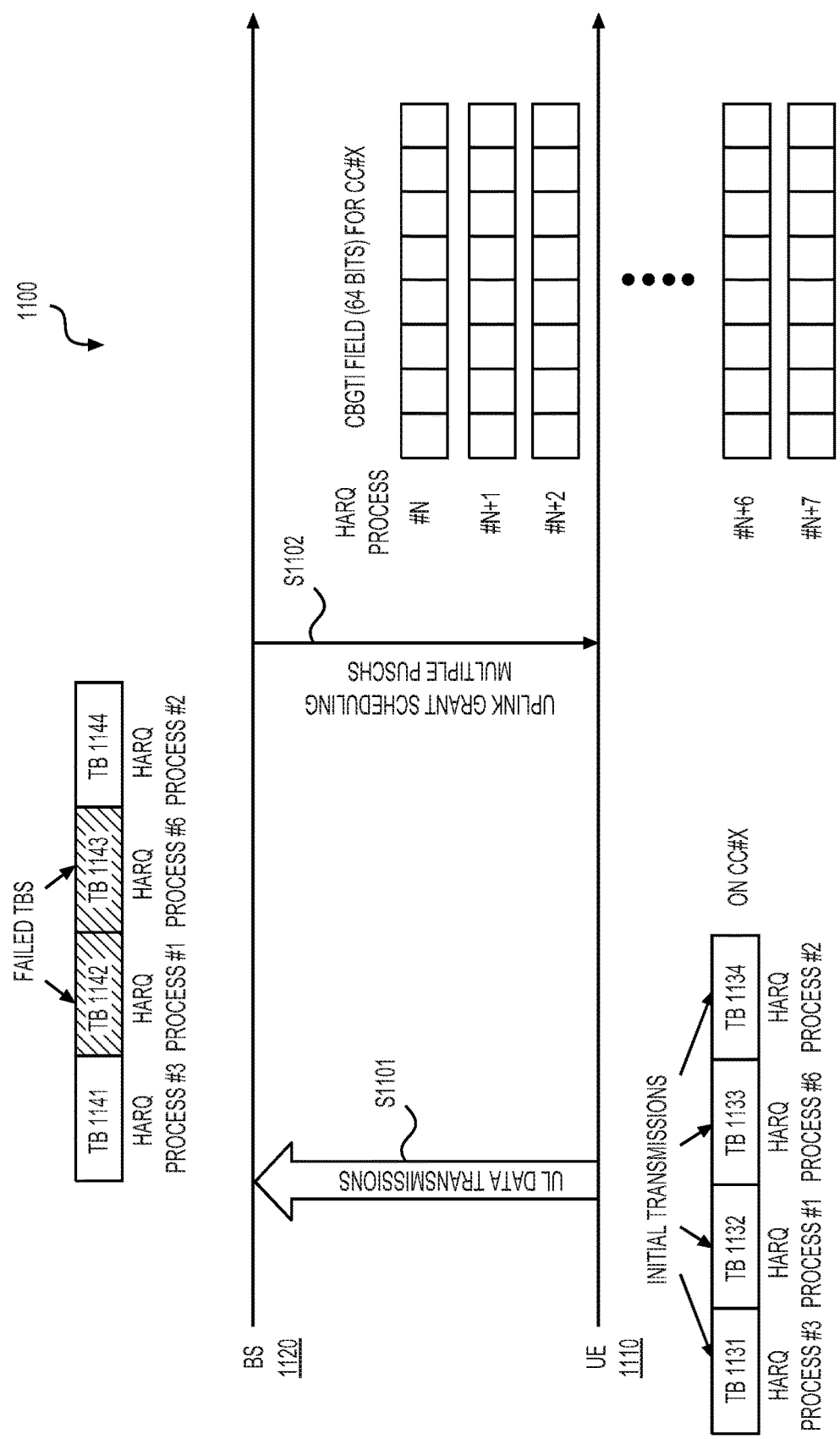
FIG. 11 shows an example process 1100 of a single uplink grant scheduling multiple PUSCHs where CBG-level retransmission indications are included in the uplink grant.

FIG. 11 shows an example process 1100 of a single uplink grant scheduling multiple PUSCHs where CBG-level retransmission indications are included in the uplink grant. The process 1100 can include steps S1101 and S1102, and be performed by a UE 1110 and a BS 1120.

At S1101, the UE 1110 can perform a set of initial transmissions of TBs 1131-1134 with HARQ processes #3, #1, #6, and #2, respectively, over a component carrier CC #x. The BS 1120 performs reception to obtain decoded TBs 1141-1144. The initial transmissions of the TBs 1131-1134 can be CBG-level-based. The decoded TBs 1142 and 1143 may include CBGs that are incorrectly decoded.

At S1102, the BS 1120 can transmit an uplink grant scheduling multiple PUSCHs. For example, the uplink grant can indicate multiple HARQ processes from #n to #n+7 for multiple uplink transmissions (initial transmissions or retransmissions) over the scheduled PUSCHs. As an example, a maximum of 8 CBGs can be carried in one TB by a configuration of the BS 1120. Accordingly, a CBGTI field in the uplink grant can include 64 bits (for 8 HARQ processes each corresponding to 8 CBGs). The HARQ processes from #n to #n+7 can include the HARQ processes #1 and #6 corresponding the failed TBs 1142 and 1143. The respective CBGTI bits can indicate which CBGs of the initial TBs 1132 and 1133 need to be retransmitted. In response to receiving the uplink grant at S1102, the UE 1110 may perform data retransmissions or initial data transmissions subsequently according to the indication by the CBGTI field in the uplink grant at S1102. The process 1100 can terminate thereafter.

Figure 12:
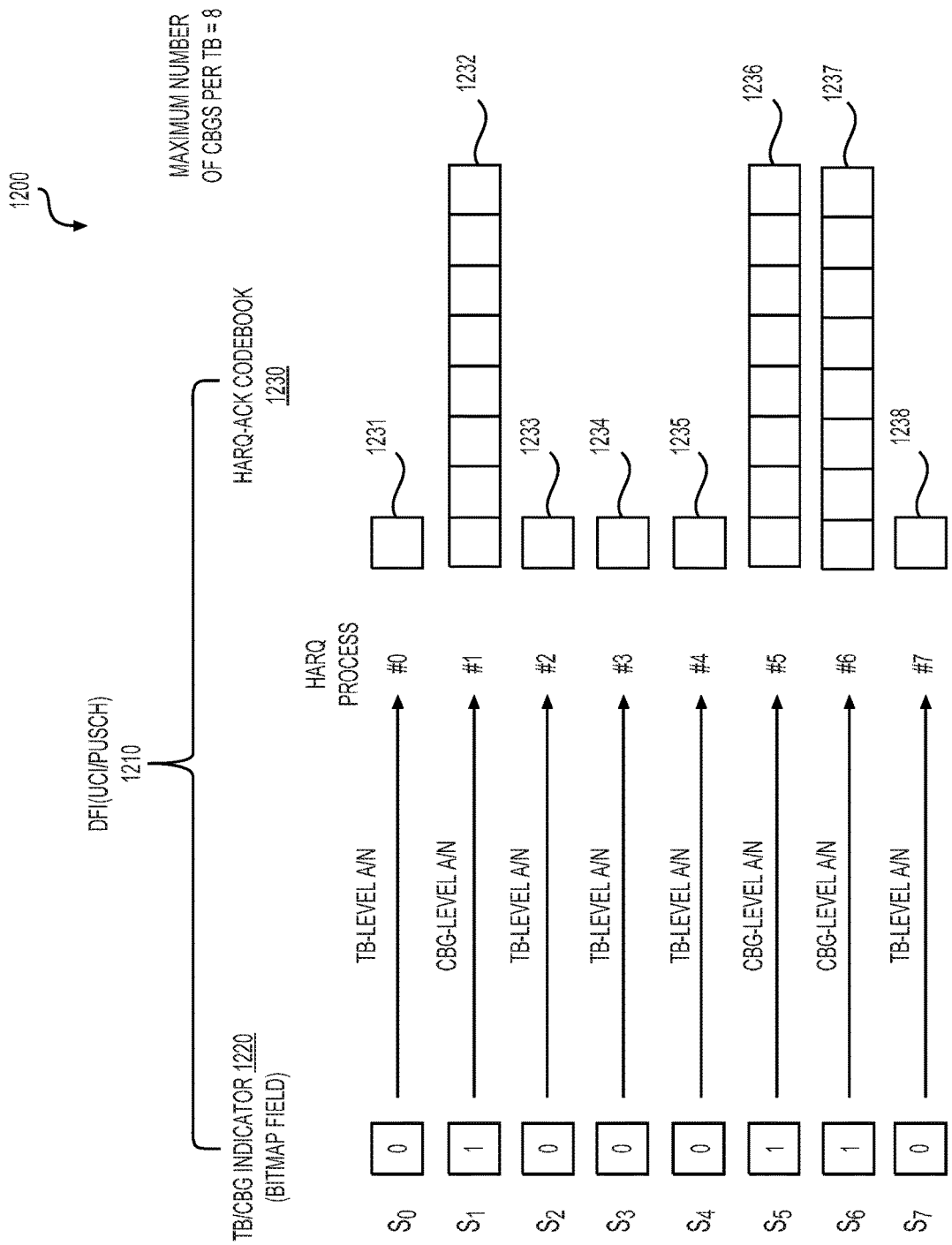
FIG. 12 shows an example of a TB/CBG-level hybrid HARQ-ACK feedback 1200 according to an embodiment of the disclosure.

FIG. 12 shows an example of a TB/CBG-level hybrid HARQ-ACK feedback 1200 according to an embodiment of the disclosure. For example, a receiver receives TBs from a transmitter. CBG-level retransmission is enabled between the receiver and the transmitter. A maximum of 8 CBGs per TB is configured. The hybrid HARQ-ACK feedback 1200 can be carried in a DFI, a UCI, or a PUSCH, and transmitted from the receiver to the transmitter.

The hybrid HARQ-ACK feedback 1200 can include a TB/CBG indicator 1220, and a HARQ-ACK codebook 1230. In the FIG. 12 example, the HARQ-ACK codebook 1230 includes HARQ-ACK feedbacks 1231-1238 for all HARQ processes #0-#7 configured at the receiver, and thus is a codebook of a one-shot HARQ-ACK feedback. In other examples, the HARQ-ACK codebook 1230 can include a subset of all HARQ processes configured at the receiver.

The TB/CBG indicator 1220 can be a bitmap field including bits S0-S7. Each bit S0-S7 corresponds to one of the HARQ processes #0-#7. The bit S0-S7 indicates whether the respective HARQ process #0-#7 is provided with the respective HARQ-ACK feedback 1231-1238 in TB level or CBG level. For example, the bits S0, S2-S4, and S7 indicate the HARQ-ACK feedbacks of the HARQ processes #0, #2-#4, and #7 are TB-level, while the bits S1, S5, and S6 indicate the HARQ-ACK feedbacks of the HARQ processes #1, #5, and #6 are CBG-level. As shown, the number of HARQ-ACK processes having CBG-level HARQ-ACK feedbacks is reduced from 8 to 3 in the hybrid HARQ-ACK codebook 1200 compared with a HARQ-ACK codebook with pure CBG-level HARQ-ACK feedbacks.

In other examples, the HARQ-ACK feedbacks 1231-1238 in the HARQ-ACK codebook 1230 may all be TB-level or all be CBG-level depending on correctly or incorrectly decoded CBGs in each HARQ-ACK feedback.

In some examples, in order to limit the size of the hybrid HARQ-ACK feedback 1200, an amount of HARQ processes with CBG-level HARQ-ACK feedbacks is restricted to be smaller or equal to a preconfigured number. For example, a maximum number of HARQ processes with CBG-level HARQ feedbacks is set to be 4. If the maximum number is reached, an additional HARQ processes with both failed and successful CBGs can be restricted to have a TB-level HARQ-ACK feedback. In this way, a payload size corresponding to the hybrid HARQ-ACK feedback 1200 can be controlled to be below a limitation.

In addition, the HARQ processes in the hybrid HARQ-ACK feedback 1200 can belong to a same component carrier or different component carriers when a carrier aggregation scheme is employed. For example, the HARQ-ACK codebook 1230 can include a one-shot HARQ-ACK feedback of HARQ-ACK processes belonging to multiple component carriers.

Figure 13:
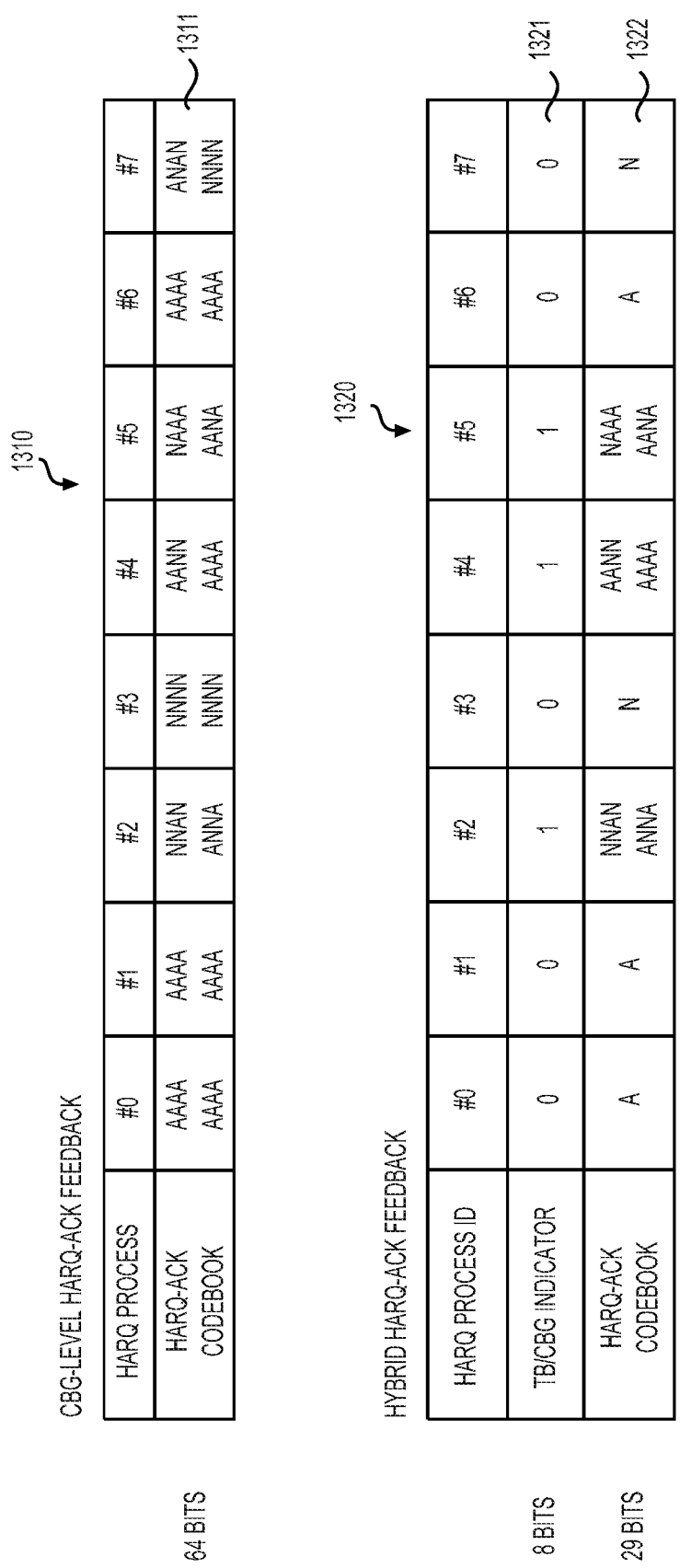
FIG. 13 shows a comparison between an all CBG-level HARQ-ACK feedback 1310 and a hybrid HARQ-ACK feedback 1320.

FIG. 13 shows a comparison between an all CBG-level HARQ-ACK feedback 1310 and a hybrid HARQ-ACK feedback 1320. As shown, the CBG-level HARQ-ACK feedback 1310 can be a HARQ-ACK codebook 1311 where each HARQ Process #0-#7 includes 8 ACK/NACK bits. Each ACK/NACK bit corresponds to a CBG in a TB. The hybrid HARQ-ACK feedback 1320 can include a TB/CBG indicator (a bitmap field) 1321, and a HARQ-ACK codebook 1322.

As shown in the CBG-level HARQ-ACK feedback 1310, for the HARQ processes #0, #1, and #6, all CBGs in a TB are correctly decoded, and 8 ACK bits are provided. In contrast, in the hybrid HARQ-ACK feedback 1320, the HARQ-ACK feedbacks for the HARQ processes #0, #1, and #6 are converted to TB-level, and each provided with a single ACK bit. Similarly, the CBG-level HARQ-ACK feedback of the HARQ-ACK process #3 in the CBG-level HARQ-ACK feedback 1310 is converted to TB level in the hybrid HARQ-ACK feedback 1320, and provided with a NACK bit.

Particularly, for the HARQ process #7 having both correctly and incorrectly decoded CBGs, the CBG-level HARQ-ACK feedback is also converted to TB level to satisfy a limitation of a maximum number of HARQ processes having a CBG-level HARQ-ACK feedback. For the remaining HARQ processes #2, #4, and #5, the 8-bit CBG-level HARQ-ACK feedbacks are maintained between the CBG-level and hybrid HARQ-ACK feedbacks 1310 and 1320 to facilitate CBG-based data retransmission.

Accordingly, the TB/CBG indicator 1321 provides a bit of 0 to indicate the HARQ-ACK processes #0, #1, #3, #6, and #7 are provided with TB-level HARQ-ACK feedbacks, and a bit of 1 to indicate the HARQ-ACK processes #2, #4, and #5 are provided with CBG-level HARQ-ACK feedbacks.

As shown in FIG. 13, a size of the HARQ-ACK feedback is reduced from 64 bits in the CBG-level HARQ-ACK feedback 1310 to 37 bits in the hybrid HARQ-ACK feedback.

Figure 14:
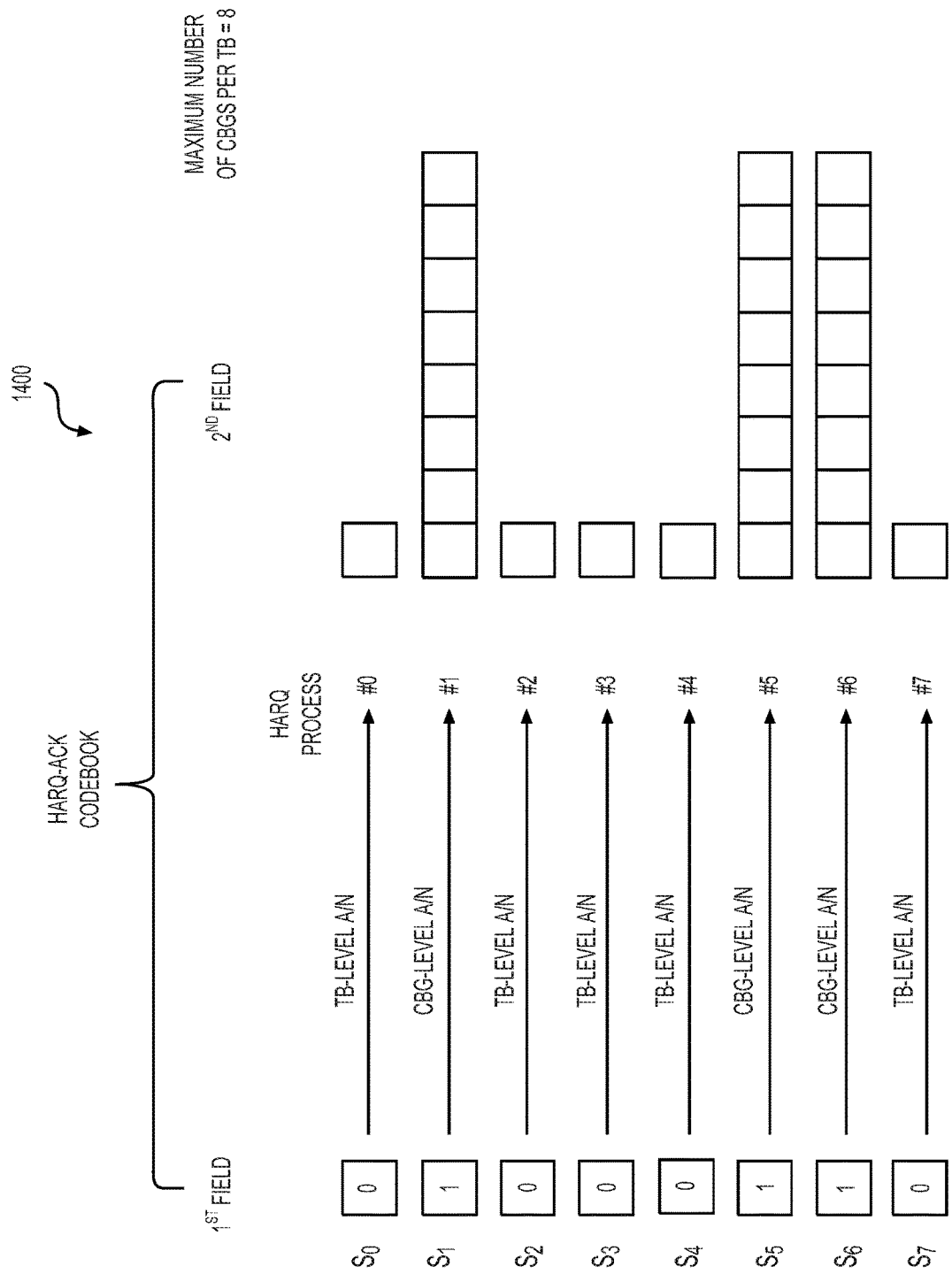
FIG. 14 shows a variation of the hybrid HARQ-ACK feedback 1200.

FIG. 14 shows a variation of the hybrid HARQ-ACK feedback 1200. As shown, the hybrid HARQ-ACK feedback 1200 is contained in a HARQ-ACK codebook 1400 that includes a first field and a second field. The first field corresponds to the TB/CBG indicator 1220, while the second field corresponds to the HARQ-ACK codebook 1230.

Figure 15:
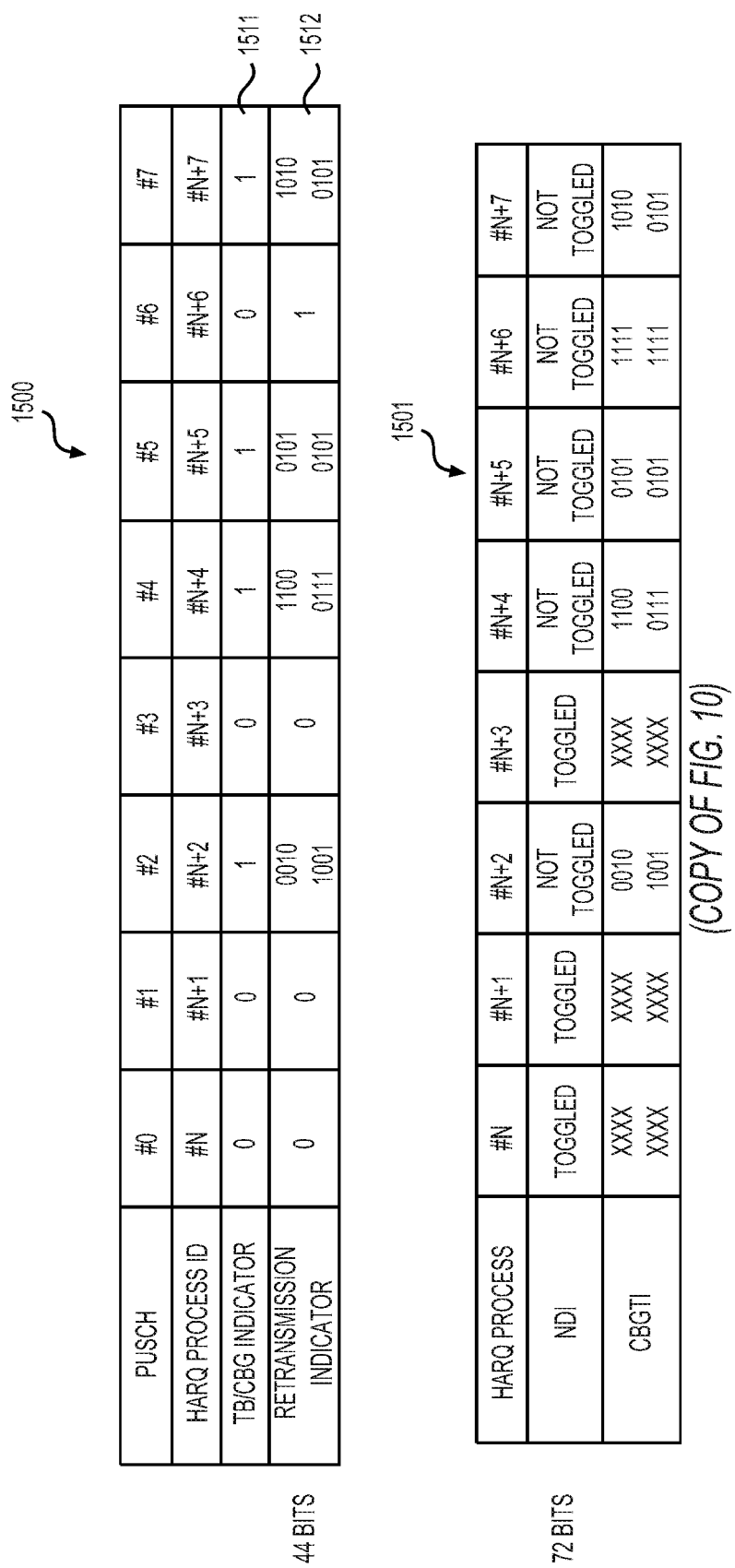
FIG. 15 shows an example of a TB/CBG-level hybrid retransmission indication 1500 according to an embodiment of the disclosure.

FIG. 15 shows an example of a TB/CBG-level hybrid retransmission indication 1500 according to an embodiment of the disclosure. For example, a DCI (including an uplink grant) scheduling multiple PUSCHs #0-#7 can be transmitted from a BS to a UE. The multiple PUSCHs #0-#7 correspond to multiple HARQ processes #n-#n+7. The DCI can carry information of the hybrid retransmission indication 1500. The hybrid retransmission indication 1500 can include a TB/CBG indicator 1511 and a retransmission indicator 1512.

The TB/CBG indicator 1511 can indicate a retransmission indication corresponding to each of the HARQ processes #n-#n+7 is TB-level or CBG-level. For example, the TB/CBG indicator 1511 can include bits 0 or 1 each corresponding to one of the HARQ processes #n-#n+7. For the HARQ processes #n, #n+1, #n+3, and #n+6, the bit 0 is provided to indicate the respective retransmission indication is TB-level, while for the HARQ processes #n+2, #n+4, #n+5, and #n+7, the bit 1 is provided to indicate the respective retransmission indication is CBG-level. Particularly, for a HARQ process with an initial transmission, or with all CBGs in the respective TB to be retransmitted, the bit 1 is provided to indicate the respective retransmission indication is TB-level.

The retransmission indicator 1512 can include a retransmission indication (1 bit or 8 bits) for each HARQ process. Each retransmission indicator can indicate whether the respective PUSCH is an initial transmission or a retransmission. For example, a retransmission indication of value 0 for the HARQ processes #n, #n+1, and #n+3 indicates an initial transmission, while a retransmission indication of value 1 (for the HARQ process #n+6), or a retransmission indication of 8 bits (for the HARQ processes #n+2, #n+4, and #n+5) indicates a retransmission.

Compared with the retransmission indication information 1000 in FIG. 10 (reproduced in FIG. 15 as retransmission indication information 1501), the NDI and CBGTI in FIG. 10 is replaced with the TB/CBG indicator 1511 and the retransmission indicator 1512. The size of the retransmission indication information is reduced from 72 bits in the CBG-level retransmission indication information 1000 to 44 bits in the hybrid retransmission indication 1500.

Similar to the hybrid HARQ-ACK feedback 1200 in FIG. 12, the retransmission indications for each HARQ process in FIG. 15 can all be TB-level or all be CBG-level. A maximum number of HARQ processes with CBG-level retransmission indications can be configured to control the size of the hybrid retransmission indication 1500. The HARQ processes indicated in the DCI scheduling the multiple PUSCHs can belong to a same component carrier or different component carriers.

FIG. 16 shows an example of HARQ-ACK codebook 1610 according to an embodiment of the disclosure. For example, a receiver receives TBs from a transmitter. Eight HARQ processes #0-#7 are configured at the receiver. CBG-level retransmission is enabled between the receiver and the transmitter. A maximum of 8 CBGs per TB is configured. The HARQ-ACK codebook 1610 can be carried in a DFI, a UCI, or a PUSCH, and transmitted from the receiver to the transmitter.

The HARQ-ACK codebook 1610 can include a first field 1620 and a second field 1630. The first field 1620 can be a bitmap field including bits S0-S7. Each bit S0-S7 corresponds to one of the HARQ processes #0-#7. The first field 1620 can indicate ACKs or NACKs for each HARQ process #0-#7 in TB level with the respective bit S0-S7. For example, for the HARQ processes #0, #2-#4, and #7, all CBGs in the respective TBs have been correctly received. Thus, a TB-level ACK can be provided for each HARQ process #0, #2-#4, or #7 in the first field 1620 to indicate an entire TB has been correctly decoded.

In contrast, for the HARQ processes #1, #5, and #6, a TB-level NACK is provided in the first field 1620 to indicate at least one CBG has not been decoded correctly for the respective HARQ process, or the respective TB has been missed (not detected). Particularly, in the second field, CBG-level ACKs or NACKs 1632, 1636, and 1637 are further provided for the HARQ processes #1, #5, and #6 with the TB-level NACKs in the first field 1620.

In the FIG. 13 example, the HARQ process #3 has 8 failed CBGs in the HARQ-ACK codebook 1311, and a TB-level NACK is used in the hybrid HARQ-ACK codebook 1322. Compared with the FIG. 13 example, in FIG. 16, all HARQ processes with a failed CBG can each be provided with CBG-level ACKs or NACKs even all CBGs are failed in the respective HARQ process. In addition, in FIG. 16, for the HARQ processes with TB-level ACKs, no bits are carried in the second field 1630.

The TB-level ACK/NACK bits S0-S7 in the first field 1620 can all be ACKs or NACKs depending on whether the respective CBGs are all received correctly. In addition, the HARQ processes #0-#7 indicated in the HARQ-ACK codebook 1610 can belong to a same component carrier or different component carriers.

FIG. 17 shows an example of a retransmission indication 1710 according to an embodiment of the disclosure. For example, a DCI (including an uplink grant) scheduling multiple PUSCHs can be transmitted from a BS to a UE. The multiple PUSCHs correspond to multiple HARQ processes #0-#7. The DCI can carry information of the retransmission indication 1710. The retransmission indication 1710 can include a first field 1720 and a second field 1730.

The first field 1720 can be a bitmap field including bits S0-S7. Each bit S0-S7 corresponds to one of the HARQ processes #0-#7. The first field 1720 can indicate with the respective bit S0-S7 whether the transmission corresponding to each HARQ process #0-#7 is a new (initial) transmission or a retransmission. For example, for the HARQ processes #0, #2-#4, and #7, new transmissions are indicated in the first field 1720, while for the HARQ processes #1, #5, and #6, retransmissions are indicated in the first field 1720. In addition, for the HARQ processes with retransmission indications, CBG-level retransmission indications 1732, 1736, and 1737 are provided in the second field. In one example, each bit in the first field can be a NDI bit corresponding to each HARQ processes.

In the FIG. 15 example, the HARQ processes #n+6 has 8 failed CBGs, and a TB-level retransmission indication of one bit is provided in the retransmission indicator 1512. In contrast, in FIG. 17, for a HARQ process having 8 failed CBG, and a CBG-level retransmission indication is provided in the second field 1730 instead of a TB-level retransmission indication. In addition, in FIG. 17, for the HARQ processes with a new transmission in the first field 1720, no bits are carried in the second field 1730.

The new transmission or retransmissions indicated in the first field 1620 can all be new transmission or retransmissions depending on whether the respective CBGs are all received correctly. In addition, the HARQ processes #0-#7 indicated in the retransmission indication 1710 can belong to a same component carrier or different component carriers.

Figures 18, 19:
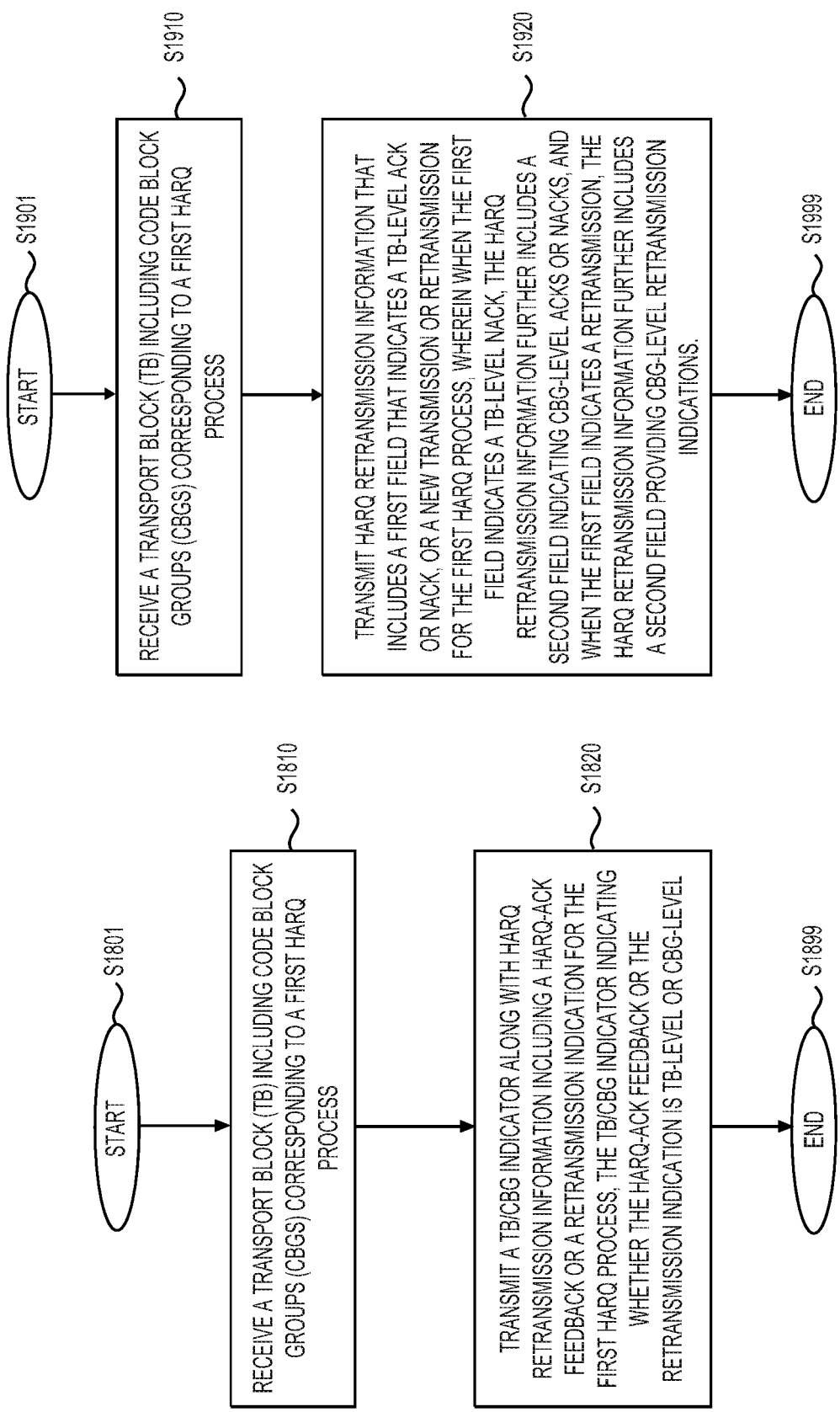
FIG. 18 shows an example of a CBG-based HARQ retransmission process 1800 according to an embodiment of the disclosure.
FIG. 19 shows an example of a retransmission process 1900 according to an embodiment of the disclosure.

FIG. 18 shows an example of a CBG-based HARQ retransmission process 1800 according to an embodiment of the disclosure. The process 1800 employs the TB/CBG-level hybrid HARQ feedback mechanism disclosed herein. The process 1800 can be performed at a receiver that receives TBs from a transmitter. The transmitter and the receiver are part of a wireless communication network. The process 1800 can start from S1801 and proceed to S1810.

At S1810, a TB including CBGs can be received at the receiver. The reception of the TB can be performed by a first HARQ process.

At S1820, hybrid HARQ feedback information can be transmitted from the receiver. The hybrid HARQ feedback information can include a TB/CBG indicator and HARQ retransmission information. The HARQ retransmission information can be either a HARQ-ACK codebook or a retransmission indicator for a number of HARQ processes configured at the receiver. For example, the HARQ-ACK codebook can be a codebook of a one-shot HARQ-ACK feedback. The retransmission indicator can be included in an uplink grant scheduling multiple PUSCHs. The HARQ-ACK codebook can provide a HARQ-ACK feedback for each of the number of HARQ processes, while the retransmission indicator can provide a retransmission indication for each of the number of HARQ processes.

The indicator can indicate the HARQ-ACK feedback or the retransmission indication for each of the number of HARQ processes is TB-level or CBG-level. The process 1800 can proceed to S1899, and terminates at S1899.

FIG. 19 shows an example of a retransmission process 1900 according to an embodiment of the disclosure. In the process 1900, HARQ retransmission information of TB-level ACK/NACK combined with CBG-level ACK/NACK for negatively acknowledged HARQ processes, or TB-level new transmission or retransmission indications combined with CBG-level retransmission indications for HARQ processes performing retransmissions are transmitted from a receiver to a transmitter. The process 1900 can start from S1901 and proceed to S1910.

At S1910, a TB including CBGs can be received at the receiver. The reception of the TB can be performed by a first HARQ process.

At S1920, the HARQ retransmission information can be transmitted from the receiver. The HARQ retransmission information can be either a HARQ-ACK codebook or a retransmission indication for a number of HARQ processes configured at the receiver. For example, the HARQ-ACK codebook can be a codebook of a one-shot HARQ-ACK feedback. The retransmission indication can be included in an uplink grant scheduling multiple PUSCHs.

The HARQ retransmission information can include a first field and a second field. For the retransmission information being the HARQ-ACK codebook, the first field can indicate a TB-level ACK or NACK for the first process. When a TB-level NACK is indicated, the second field of the retransmission information can further indicate CBG-level ACKs or NACKs for the first HARQ process.

For the retransmission information being the retransmission indication, the first field can indicate a new transmission or a retransmission for the first process. When a retransmission is indicated, the second field of the retransmission information can further provide CBG-level retransmission indications for the first HARQ process. The process 1900 can proceed to S1999, and terminates at S1999.

Figure 20:
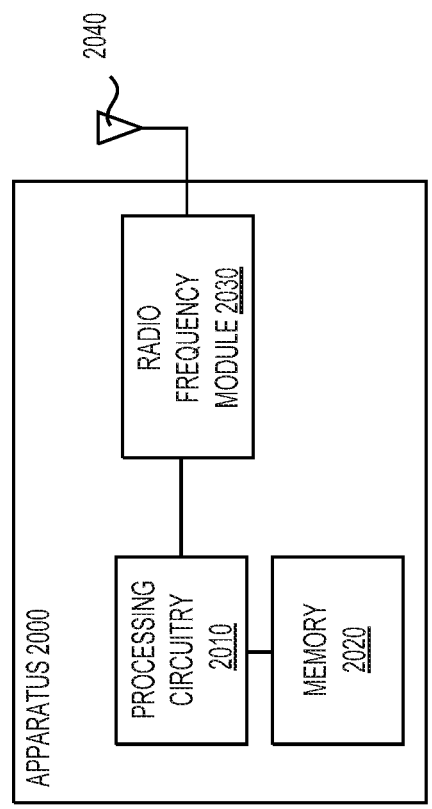
FIG. 20 shows an example apparatus 2000 according to embodiments of the disclosure.

FIG. 20 shows an example apparatus 2000 according to embodiments of the disclosure. The apparatus 2000 can be configured to perform various functions in accordance with one or more embodiments or examples described herein. Thus, the apparatus 2000 can provide means for implementation of mechanisms, techniques, processes, functions, components, systems described herein. For example, the apparatus 2000 can be used to implement functions of the UEs, the BSs, the transmitters, and the receivers in various embodiments and examples described herein. The apparatus 2000 can include a general purpose processor or specially designed circuits to implement various functions, components, or processes described herein in various embodiments. The apparatus 2000 can include processing circuitry 2010, a memory 2020, and a radio frequency (RF) module 2030.

In various examples, the processing circuitry 2010 can include circuitry configured to perform the functions and processes described herein in combination with software or without software. In various examples, the processing circuitry 2010 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 2010 can be a central processing unit (CPU) configured to execute program instructions to perform various functions and processes described herein. Accordingly, the memory 2020 can be configured to store program instructions. The processing circuitry 2010, when executing the program instructions, can perform the functions and processes. The memory 2020 can further store other programs or data, such as operating systems, application programs, and the like. The memory 2020 can include non-transitory storage media, such as a read only memory (ROM), a random access memory (RAM), a flash memory, a solid state memory, a hard disk drive, an optical disk drive, and the like.

In an embodiment, the RF module 2030 receives a processed data signal from the processing circuitry 2010 and converts the data signal to beamforming wireless signals that are then transmitted via antenna arrays 2040, or vice versa. The RF module 2030 can include a digital to analog convertor (DAC), an analog to digital converter (ADC), a frequency up convertor, a frequency down converter, filters and amplifiers for reception and transmission operations. The RF module 2030 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 2040 can include one or more antenna arrays.

The apparatus 2000 can optionally include other components, such as input and output devices, additional or signal processing circuitry, and the like. Accordingly, the apparatus 2000 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
receiving a set of transport blocks (TBs) from a transmitter at a receiver in a wireless communication system, each TB including one or more code block groups (CBGs) and corresponding to a hybrid automatic repeat request (HARQ) process; and
performing a transmission from the receiver, the transmission including one or more first bits of a TB/CBG indicator and one or more second bits of HARQ retransmission information for the HARQ processes corresponding to the set of TBs, the HARQ retransmission information including HARQ acknowledgement (HARQ-ACK) feedbacks or retransmission indications for the HARQ processes corresponding to the TBs, the TB/CBG indicator including indications for indicating whether each of the HARQ-ACK feedbacks or the retransmission indications included in the HARQ retransmission information is TB-level or CBG-level, the one or more first bits and the one or more second bits being different bits, a first value of the one or more first bits indicating the respective one of the HARQ-ACK feedbacks or the retransmission indications is TB-level, a second value of the one or more first bits indicating the respective one of the HARQ-ACK feedbacks or the retransmission indications is CBG-level.

2. The method of claim 1, wherein the transmitter is a UE, and the receiver is a BS in the wireless communication system, and
the HARQ retransmission information is one of:
a HARQ-ACK codebook including the HARQ-ACK feedbacks for the HARQ processes corresponding to the set of TBs; or
a retransmission indicator including the retransmission indications for the HARQ processes corresponding to the set of TBs.

3. The method of claim 2, wherein the TB/CBG indicator indicates:
whether each of the HARQ-ACK feedbacks for the HARQ processes corresponding to the set of TBs is TB-level or CBG-level, or
whether each of the retransmission indications for the HARQ processes corresponding to the set of TBs is TB-level or CBG-level.

4. The method of claim 2, wherein the retransmission indicator is included in an uplink grant that schedules multiple uplink data transmissions corresponding to the HARQ processes corresponding to the set of TBs.

5. The method of claim 1, wherein one of the HARQ processes is provided with the HARQ-ACK feedback in TB level when:
all the CBGs in the TB of the one of the HARQ process are decoded correctly;
no CBG in the TB of the one of the HARQ process is decoded correctly; or
the TB of the one of the HARQ process is not detected.

6. The method of claim 1, wherein one of the HARQ processes is provided with the retransmission indication in TB level when:
all the CBGs in the TB of the one of the HARQ process are decoded correctly; or
no CBG in the TB of the one of the HARQ process is decoded correctly.

19

7. The method of claim 1, wherein the HARQ retransmission information includes the HARQ-ACK feedbacks or the retransmission indications for the HARQ processes corresponding to the set of TBs belonging to a same component carrier or different component carriers used by the transmitter and the receiver.

8. The method of claim 1, wherein an amount of HARQ processes in the HARQ retransmission information that are each provided with a HARQ-ACK feedback or a retransmission indication in CBG level is restricted to be smaller or equal to a preconfigured number.

9. A receiver, comprising circuitry configured to:
receive a set of transport blocks (TBs) from a transmitter at a receiver in a wireless communication system, each TB including one or more code block groups (CBGs) and corresponding to a hybrid automatic repeat request (HARQ) process; and
perform a transmission that includes one or more first bits of a TB/CBG indicator and one or more second bits of HARQ retransmission information for the HARQ processes corresponding to the set of TBs, the HARQ retransmission information including HARQ acknowledgement (HARQ-ACK) feedbacks or retransmission indications for the HARQ processes corresponding to the TBs, the TB/CBG indicator including indications for indicating whether each of the HARQ-ACK feedbacks or the retransmission indications included in the HARQ retransmission information is TB-level or CBG-level, the one or more first bits and the one or more second bits being different bits, a first value of the one or more first bits indicating the respective one of the HARQ-ACK feedbacks or the retransmission indications is TB-level, a second value of the one or more first bits indicating the respective one of the HARP-ACK feedbacks or the retransmission indications is CBG-level.

10. The receiver of claim 9, wherein the transmitter is a UE, and the receiver is a BS in the wireless communication system, and
the HARQ retransmission information is one of:
a HARQ-ACK codebook including HARQ-ACK feedbacks the HARQ processes corresponding to the set of TBs; or
a retransmission indicator including the retransmission indications for the HARQ processes corresponding to the set of TBs.

11. The receiver of claim 10, wherein the TB/CBG indicator indicates:
whether each of the HARQ-ACK feedbacks for the HARQ processes corresponding to the set of TBs is TB-level or CBG-level, or
whether each of the retransmission indications for the HARQ processes corresponding to the set of TBs is TB-level or CBG-level.

12. The receiver of claim 10, wherein the retransmission indicator is included in an uplink grant that schedules multiple uplink data transmissions corresponding to the HARQ processes corresponding to the set of TBs.

13. The receiver of claim 9, wherein one of the HARQ processes is provided with the HARQ-ACK feedback in TB level when:
all the CBGs in the TB of the one of the HARQ process are decoded correctly;
no CBG in the TB of the one of the HARQ process is decoded correctly; or
the TB of the one of the HARQ process is not detected.

20

14. The receiver of claim 9, wherein one of the HARQ processes is provided with the retransmission indication in TB level when:
all the CBGs in the TB of the one of the HARQ process are decoded correctly; or
no CBG in the TB of the one of the HARQ process is decoded correctly.

15. The receiver of claim 9, wherein the HARQ retransmission information includes the HARQ-ACK feedbacks or the retransmission indications for the HARQ processes corresponding to the set of TBs belonging to a same component carrier or different component carriers used by the transmitter and the receiver.

16. A method, comprising:
receiving a transport block (TB) including one or more code block groups (CBGs) corresponding to a first hybrid automatic repeat request (HARQ) process from a transmitter at a receiver in a wireless communication system; and
transmitting HARQ retransmission information for the first HARQ process from the receiver,
wherein the HARQ retransmission information includes a first field that indicates a TB-level positive acknowledgement (ACK) or negative acknowledgement (NACK) for the first HARQ process, or indicates a new transmission or retransmission for the first HARQ process,
when the first field indicates a TB-level NACK for the first HARQ process, the HARQ retransmission information further includes a second field indicating CBG-level ACKs or NACKs for the first HARQ process, and when the first field indicates a TB-level ACK for the first HARQ process, no second field is provided in the HARQ retransmission information for the first HARQ process, and
when the first field indicates a retransmission for the first HARQ process, the HARQ retransmission information further includes a second field providing CBG-level retransmission indications for the first HARQ process, and when the first field indicates a new transmission for the first HARQ process, no second field is provided in the HARQ retransmission information for the first HARQ process.

17. The method of claim 16, wherein the transmitter is a base station (BS) and the receiver is a user equipment (UE) in the wireless communication system, and
the first field of the HARQ retransmission information indicates TB-level ACKs or NACKs for a number of HARQ processes configured at the UE.

18. The method of claim 16, wherein the transmitter is a UE, and the receiver is a BS in the wireless communication system, and
the first field of the HARQ retransmission information indicates TB-level ACKs or NACKs for a first number of HARQ processes configured at the UE, or TB-level new transmissions or retransmissions for a second number of HARQ processes configured at the UE.

19. The method of claim 18, wherein the HARQ retransmission information is included in an uplink grant that schedules multiple uplink data transmissions corresponding to the second number of HARQ processes configured at the UE.

20. The method of claim 16, wherein the HARQ retransmission information includes TB-level ACK/NACK indications or TB-level new transmission or retransmission indications for HARQ processes belonging to a same component carrier or different component carriers used by the transmitter and the receiver.

\* \* \* \* \*